US011170750B2

(12) United States Patent
Wang et al.

(10) Patent No.: US 11,170,750 B2
(45) Date of Patent: Nov. 9, 2021

(54) ENERGY EFFICIENT SOUNDPROOFING WINDOW RETROFITS

(71) Applicant: Massachusetts Institute of Technology, Cambridge, MA (US)

(72) Inventors: Evelyn N. Wang, Cambridge, MA (US); Gang Chen, Carlisle, MA (US); Xuanhe Zhao, Allston, MA (US); Elise M. Strobach, Clear Lake, WI (US); Bikramjit S. Bhatia, Cambridge, MA (US); Lin Zhao, Revere, MA (US); Sungwoo Yang, Chattanooga, TN (US); Lee A. Weinstein, Somerville, MA (US); Thomas A. Cooper, Boston, MA (US); Shaoting Lin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 397 days.

(21) Appl. No.: 16/394,447

(22) Filed: Apr. 25, 2019

(65) Prior Publication Data
US 2019/0333490 A1 Oct. 31, 2019

Related U.S. Application Data

(60) Provisional application No. 62/662,417, filed on Apr. 25, 2018.

(51) Int. Cl.
*B32B 7/027* (2019.01)
*G10K 11/168* (2006.01)
(Continued)

(52) U.S. Cl.
CPC ............ *G10K 11/168* (2013.01); *B32B 7/027* (2019.01); *B32B 7/12* (2013.01); *B32B 9/045* (2013.01);
(Continued)

(58) Field of Classification Search
CPC .............. B32B 17/00; B32B 2307/102; B32B 2307/304
See application file for complete search history.

(56) References Cited

U.S. PATENT DOCUMENTS

| | | | |
|---|---|---|---|
| 4,610,863 A | 9/1986 | Tewari et al. | |
| 6,492,014 B1 | 12/2002 | Rolison et al. | |

(Continued)

FOREIGN PATENT DOCUMENTS

| | | |
|---|---|---|
| CN | 201416371 Y | 3/2010 |
| CN | 201835403 U | 5/2011 |

(Continued)

OTHER PUBLICATIONS

Office Action dated Apr. 10, 2020 for U.S. Appl. No. 16/079,172, filed Aug. 23, 2018 (27 pages).

(Continued)

*Primary Examiner* — Elizabeth E Mulvaney
(74) *Attorney, Agent, or Firm* — Goodwin Procter LLP

(57) ABSTRACT

Described herein are window retrofits including a monolithic silica aerogel slab having (i) an average haze value of <5% as calculated in accordance with ASTM standard D1003-13 and (ii) a U-factor of <0.5 BTU/sf/hr/° F., and a transparent polymer envelope sealed at an internal pressure of ≤1 atmosphere, wherein the monolithic silica aerogel slab is encapsulated in the transparent polymer envelope. The monolithic aerogel slab can have a transmittance >94% at 8 mm thickness. The window retrofit can be bonded to a glass sheet.

20 Claims, 19 Drawing Sheets

(51) Int. Cl.
  *B32B 7/12* (2006.01)
  *B32B 9/04* (2006.01)
  *E06B 9/24* (2006.01)

(52) U.S. Cl.
  CPC ............ *E06B 9/24* (2013.01); *B32B 2255/10* (2013.01); *B32B 2255/20* (2013.01); *B32B 2305/026* (2013.01); *B32B 2307/102* (2013.01); *B32B 2307/304* (2013.01); *B32B 2307/412* (2013.01); *B32B 2307/54* (2013.01); *B32B 2307/546* (2013.01); *B32B 2307/72* (2013.01); *E06B 2009/2417* (2013.01)

(56) References Cited

U.S. PATENT DOCUMENTS

| | | | |
|---|---|---|---|
| 9,022,020 | B2 | 5/2015 | Mills et al. |
| 9,102,076 | B2 | 8/2015 | Doshi et al. |
| 2006/0059852 | A1 | 3/2006 | Toas et al. |
| 2008/0229704 | A1 | 9/2008 | Augustyniak et al. |
| 2009/0029147 | A1 | 1/2009 | Tang et al. |
| 2010/0186333 | A1 | 7/2010 | Miller |
| 2011/0120031 | A1 | 5/2011 | Scherba |
| 2012/0279492 | A1 | 11/2012 | Spinelli et al. |
| 2013/0106008 | A1 | 5/2013 | Ahn et al. |
| 2014/0065329 | A1 | 3/2014 | Showers |
| 2015/0053266 | A1 | 2/2015 | Chen et al. |
| 2017/0010023 | A1 | 1/2017 | Slocum et al. |
| 2017/0022106 | A1 | 1/2017 | Buttner et al. |
| 2017/0022345 | A1 | 1/2017 | Dufour et al. |
| 2017/0022703 | A1 | 1/2017 | Buttner et al. |
| 2018/0093456 | A1 | 4/2018 | Van Overmeere et al. |
| 2019/0100439 | A1 | 4/2019 | Chen et al. |

FOREIGN PATENT DOCUMENTS

| | | |
|---|---|---|
| CN | 201883601 U | 6/2011 |
| CN | 202000514 U | 10/2011 |
| CN | 202000548 U | 10/2011 |
| CN | 102536061 A | 7/2012 |
| CN | 202430882 U | 9/2012 |
| CN | 202467537 U | 10/2012 |
| CN | 104556969 A | 4/2015 |
| CN | 104762007 A | 7/2015 |
| CN | 104946058 A | 9/2015 |
| CN | 205117129 U | 3/2016 |
| CN | 105565843 A | 5/2016 |
| CN | 105566583 A | 5/2016 |
| CN | 205736249 U | 11/2016 |
| CN | 106747562 A | 5/2017 |
| CN | 107416848 A | 12/2017 |
| DE | 4201306 A1 | 7/1993 |
| EP | 0884376 A2 | 12/1998 |
| EP | 1033354 A1 | 9/2000 |
| EP | 2927194 A1 | 10/2015 |
| EP | 2522927 B1 | 12/2017 |
| GB | 2481693 A | 1/2012 |
| GB | 2488374 A | 8/2012 |
| GB | 2506430 A | 4/2014 |
| JP | H08187817 A | 7/1996 |
| JP | H1130085 A | 2/1999 |
| JP | H11333982 A | 12/1999 |
| JP | 2004183330 A | 7/2004 |
| JP | 2008045013 A | 2/2008 |
| JP | 2012140767 A | 7/2012 |
| JP | 2017039845 A | 2/2017 |
| WO | WO-1992020623 A1 | 11/1992 |
| WO | WO-2005110919 A1 | 11/2005 |
| WO | WO-2008110818 A1 | 9/2008 |
| WO | WO-2009094280 A2 | 7/2009 |
| WO | WO-2011120031 A2 | 9/2011 |
| WO | WO-2014090790 A1 | 6/2014 |
| WO | WO-2014199279 A1 | 12/2014 |
| WO | WO-2015151371 A1 | 10/2015 |
| WO | WO-2016203260 A1 | 12/2016 |
| WO | WO-2017090686 A1 | 6/2017 |
| WO | WO-2017147463 A1 | 8/2017 |
| WO | WO-2017185009 A1 | 10/2017 |

OTHER PUBLICATIONS

"Aerogel insulation for buildings," accessed Oct. 22, 2018 at https://www.designingbuildings.co.uk/wiki/Aerogel_insulation_for_buildings, 4 pages.
Berardi, "Development of Glazing systems with silica aerogel," Energy Procedia, vol. 78 (2015) pp. 394-399.
Buratti et al., "Experimental Performance Evaluation of Aerogel Glazing Systems," Applied Energy, vol. 97, (2015), pp. 430-437.
Case, "Better windows with aerogels," Chemistry World, (2016) at http://www.chemistryworld.com/news/better-windows-with-aerogels/1010158.article, 3 pages.
Cohen, "Thermal properties of advanced aerogel insulation," Thesis (S.M.)—Massachusetts Institute of Technology, (2011), 79 pages.
Dhalla, Investigating Thermal Bridging in Window Systems Insulated with Monolithic Silica Aerogel. Bachelor of Mechanical Engineering, A MRP presented to Ryerson University, (2015), 87 pages.
Dillon, "Inexpensive Aerogel Panes for Window Retrofit for ARPA-E Shield Project," http://www.cleantechnotes.org/category/clean-energy-technologies/, Clean Energy Technologies, Posted on Fraunhofer CSE Website http://cse.fraunhofer.org/, 2 pages.
Dorcheh, et al., "Silica aerogel; synthesis, properties and characterization," Journal of Materials Processing Technology, vol. 199, Issues 1-3, Apr. 1, 2008, pp. 10-26.
Dowson, "Novel Retrofit Technologies Incorporating Silica Aerogel for Lower Energy Buildings," Brunel University, School of Engineering and Design, Sep. 2012, 314 pages.
Ganobjak, et al., "Possibilities of Aerogels Application for Architectural Heritage Conservation," CISBAT (2015), pp. 51-56.
Gao, et al., "Perspective of aerogel glazings in energy efficient buildings," Building and Environment, vol. 95, (2016), pp. 405-413.
Garnier, et al., "Super insulated aerogel windows: Impact on daylighting and thermal performance," accessed Oct. 22, 2018 at https://www.infona.pl/resource/bwmeta1.element.elsevier-40498eb7-4f4f-3990-bef4-8d5e68ebc1b0, 2 pages.
Heinemann, et al., "Radiation-conduction interaction: an investigation on silica aerogels," International Journal of Heat and Mass Transfer, vol. 39, No. 10, (1996), pp. 2115-2130.
Hermann, et al., "Retrofit measures for historic buildings and cities," This article originally appeared in Context 142, published by The Institute of Historic Building Conservation in Nov. 2015, pp. 29-31.
Hunt, Light Scattering Studies of Silica Aerogels, Published 2010, Lawrence Berkeley National Laboratory, 16 pages.
Ibrahim, et al., "Performance evaluation of buildings with advanced thermal insulation systems: A numerical study," Journal of Facade Design and Engineering 4 (2016), pp. 19-34.
International Search Report and Written Opinion, PCT/US2017/019415, dated Aug. 14, 2017, 10 pages.
International Search Report and Written Opinion, PCT/US2019/029105, dated Sep. 18, 2019, 16 pages.
Lamonica, "High-tech aerogels wrap homes with insulation," accessed at https://www.cnet.com/news/high-tech-aerogels-wrap-homes-with-insulation/, (2010), 4 pages.
Licholai, et al., "Possibilities of the Aerogel Application in Building," Lviv Polytechnic National University Institutional Repository, http://ena.lp.edu.ua, (2013), 5 pages.
McEnaney et al., "Thermoelectrics and aerogels for solar energy conversion systems," download on Feb. 22, 2017, https://dspace.mit.edu/handel/1721.1/97770, 3 pages.
Nordgaard et al., "Modelling of Flat-Plate Collectors Based on Monolithic Silica Aerogel," Solar Energy, vol. 49, Issue 5, Nov. 1992, pp. 387-402.
Nusca, Super-insulating aerogels promise to make homes more energy-efficient, accessed Oct. 23, 2018, https://www.zdnet.com/article/super-insulating-aerogels-promise-to-make-homes-more-energy-efficient/, 5 pages.

(56) References Cited

OTHER PUBLICATIONS

Pan, et al., "A fast synthesis of silica aerogel powders-based on water glass via ambient drying," https://link.springer.com/journal/10971, Journal of Sol-Gel Science and Technology, (2017), vol. 82, Issue 2, pp. 594-601.

Reda, et al., "Solar Position Algorithm for Solar Radiation Applications," Technical Report, NREL/TP-560-34302 (2003), Colorado, pp. 40.

Schultz, et al., "Super insulating aerogel glazing," Solar Energy Materials & Solar Cells, vol. 89, (2005), pp. 275-285.

Shukla, et al., "Aerogel for Thermal Insulation of Interior Wall Retrofits in Cold Climates," In: Buildings Enclosure Science & Technology (BEST3) Conference, Atlanta, GA: BEST, (2012) pp. 1-12, Available at: https://c.ymcdn.com/sites/www.nibs.org/resource/resmgr/BEST/best3_shukla.2.11.pdf.

Svendsen, "Solar collector with monolithic silica aerogel," Journal of Non-Crystalline Solids, vol. 145, Dec. 1992, pp. 240-243.

Tamon et al., "Control of Mesoporous Structure of Silica Aerogel Prepared from TMOS," Journal of Colloid and Interface Science, vol. 188, Issue 1, Apr. 1, 1997, pp. 162-167.

U.S. Department of Energy, Concentrating Solar Power Commercial Application Study: Reducing Water Consumption of Concentrating Solar Power electricity Generation, Report to Congress, (2008), pp. 35.

Weinstein et al., "Concentrating Solar Power," Chemical Review, vol. 115, Oct. 2015, pp. 12797-12838.

Zhang, et al., "Synthesis, Structural and Thermal Properties of Nano-porous $SiO_2$-based Aerogels," Advances in Nanocomposites—Synthesis, Characterization and Industrial Applications, (2011), pp. 39-60.

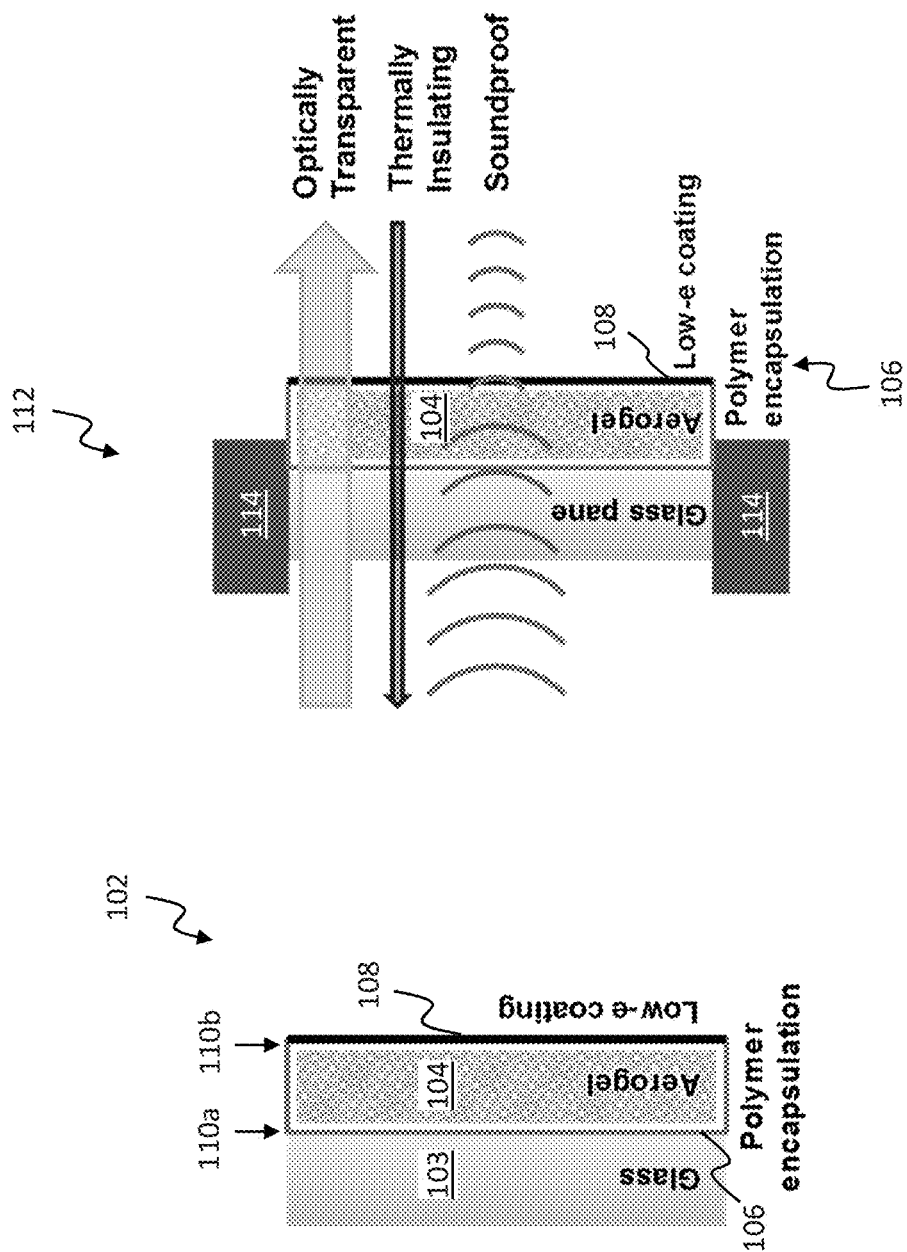

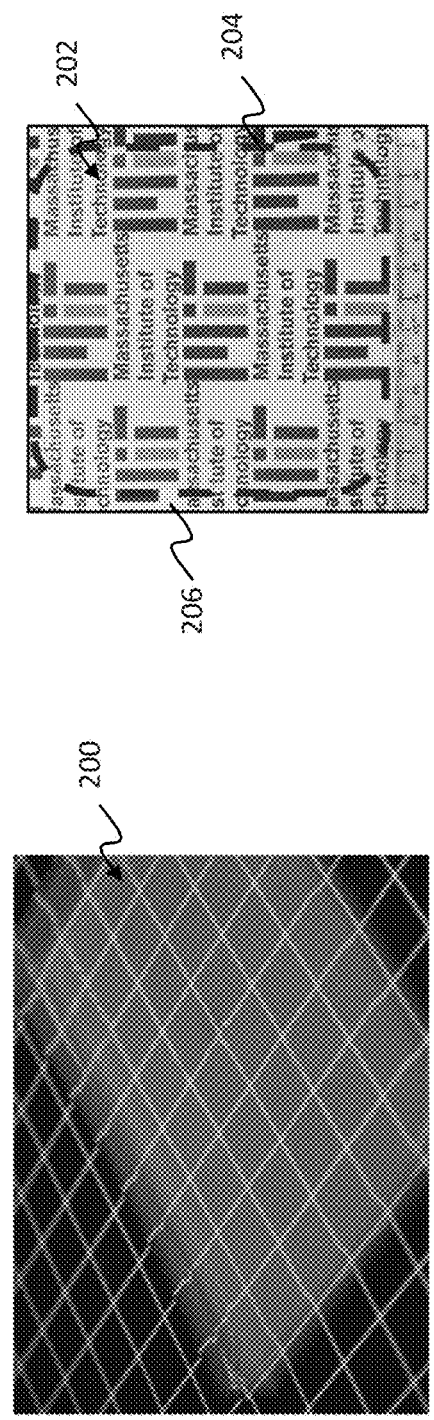

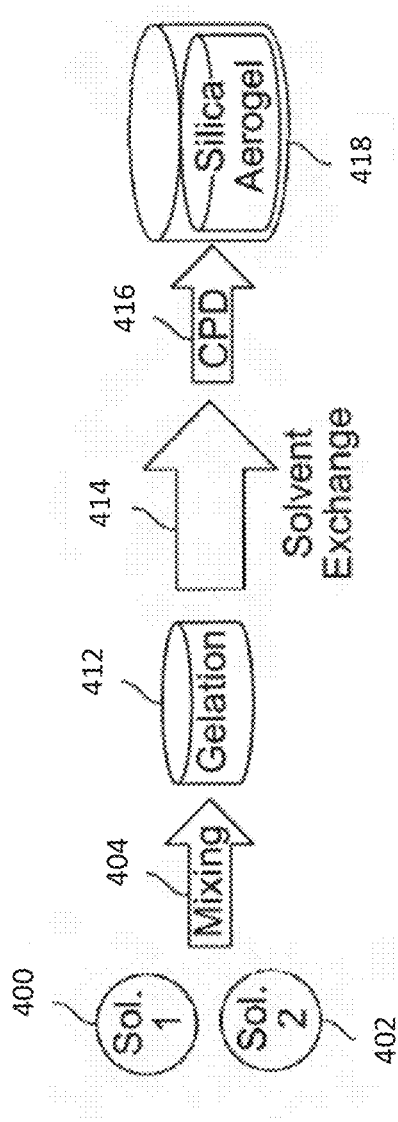
FIG. 4A
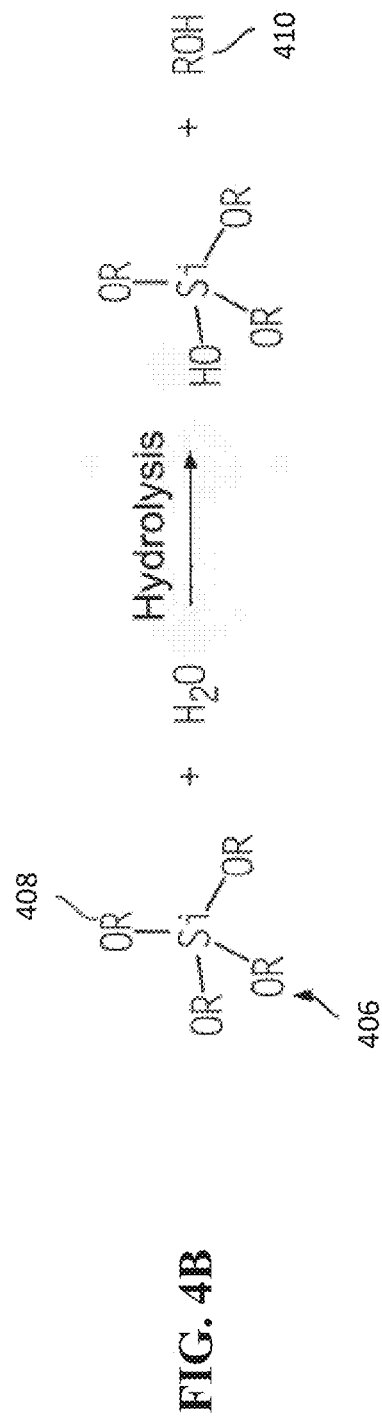
FIG. 4B
FIG. 4C

ENERGY EFFICIENT SOUNDPROOFING WINDOW RETROFITS

CROSS-REFERENCE TO RELATED APPLICATION

This application claims priority and benefit under 35 U.S.C. 119(e) of U.S. Provisional Patent Application No. 62/662,417, titled "Energy efficient soundproofing window retrofits" and filed on Apr. 25, 2018, the entire contents of which are hereby incorporated by reference herein.

GOVERNMENT LICENSE RIGHTS

This invention was made with government support under Contract No. DE-AR0000471 awarded by the Department of Energy (under the ARPA-E (Advanced Research Projects Agency-Energy) FOCUS (Full-Spectrum Optimized Conversion and Utilization of Sunlight) program). The Government has certain rights in the invention.

TECHNICAL FIELD

Embodiments of the present invention are related generally to window retrofits and methods for producing window retrofits, and more specifically, window retrofits having a monolithic silica aerogel slab and a polymer envelope and methods for producing same.

BACKGROUND

Single-pane windows are ubiquitous and constitute one of the most energy inefficient components of residences or other buildings, particularly during cold weather. While newer window installations are typically energy efficient multi-pane windows, more than a third of the total windows in the United States are single-pane windows. These single-pane windows are being phased out at a rate of only 2% per year because of the high replacement cost, leading to annual losses of about $12 billion due to high heat losses. Building heating, ventilation and air conditioning (HVAC) accounts for about 13.6 quadrillion BTU ("quads") per year or 14% of the total energy consumption in the United States. This consumption is directly related to the energy efficiency of the building envelopes. Thermal losses from heated indoors to cold outdoors account for about 3.9 quads of primary energy in the U.S. The primary reason for such large heat losses is the ubiquity of single-pane windows –30-40% of all windows in the U.S.—which conduct twice as much heat as average multi-pane windows. (See *Residential Energy Consumption Survey* (RECS), 2009; *Buildings Energy Data Book*, 2011; S. A. Joshua and K. A. Dariush, *Window-Related Energy Consumption in the US Residential and Commercial Building Stock*, 2006.)

Existing replacement options include evacuated or gas-filled insulated glass units that are expensive and are often incompatible with existing frames because of their size and weight. Alternative low-cost solutions primarily rely on retrofitted low-emissivity (or "low-e") coatings that are capable of reducing the radiative heat loss from the indoors, but tend to be susceptible to condensation during winters, which renders them ineffective.

SUMMARY

Embodiments of the invention relate to aerogel retrofits, and methods for making aerogel retrofits that are optically transparent, thermally insulating, and soundproofing for single-pane windows. A retrofit in accordance with an embodiment of the invention includes a monolithic optically transparent silica aerogel slab encapsulated in a vacuum-sealed polymer envelope. In some implementations, these retrofits can match the thermal performance of expensive air-filled double-pane glazing, while maintaining a visible transparency as good as glass (and 5-10% better than previous aerogel-based fenestration), as well as achieve soundproofing with minimal weight addition to the pane at a minimal cost, e.g., less than $2 per square foot. This cost is negligible in comparison to the $50-100 per square foot cost of replacing existing single-pane windows with energy efficient multi-pane windows. The thermally insulating, optically transparent, robust, light-weight and low-cost window retrofit reduces energy consumption. This thermal performance matches the performance of state-of-art air-filled double-pane windows. The aerogel retrofit can also resist condensation, which renders other retrofits reliant on low-e coatings ineffective, at even the lowest winter temperatures. Moreover, installation of the retrofit can maintain a reasonable radiant temperature near the window to ensure thermal comfort of the occupants.

In accordance with an embodiment of the invention, a window retrofit includes a monolithic silica aerogel slab having (i) an average haze value of <5% as calculated in accordance with ASTM standard D1003-13 and (ii) a U-factor of <0.5 BTU/sf/hr/° F.; and a transparent polymer envelope sealed at an internal pressure of ≤1 atmosphere, wherein the monolithic silica aerogel slab is encapsulated in the transparent polymer envelope.

Embodiments of the invention can include any one or more of the following features. The monolithic aerogel slab can have a transmittance >94% at 8 mm thickness. The monolithic aerogel slab can have a transmittance >96% at 3 mm thickness. The monolithic silica aerogel slab can include pores having a mean radius of less than 5 nm with a standard deviation of 3 nm. The window retrofit can include a low-emissivity coating disposed on a surface of the transparent polymer envelope. The window retrofit can include an anti-reflective coating disposed on a surface of the transparent polymer envelope. The window retrofit can include a glass sheet, the monolithic silica aerogel slab being bonded to the glass sheet, wherein the transparent polymer envelope encapsulates the monolithic silica aerogel slab bonded to the glass sheet. The slab can have the U-factor of <0.5 BTU/sf/hr/° F. at an external temperature of −15° C. or greater. The monolithic silica aerogel slab can have a porosity of at least 90%. The monolithic silica aerogel slab can have a density selected from a range of 0.1 g/cm$^3$ to 0.2 g/cm$^3$. The monolithic silica aerogel slab can have a pore volume selected from a range of 2000 cm$^3$/g to 4000 cm$^3$/g. The monolithic silica aerogel slab can have a specific surface area selected from a range of 500 m$^2$/g to 1000 m$^2$/g. The monolithic silica aerogel slab can have a thermal conductivity selected from a range of 0.005 W/m·K to 0.025 W/m·K. The monolithic silica aerogel slab may have an average sound transmission loss of 10 dB or greater at one or more frequencies selected from a range of 50 Hz to 1600 Hz. The monolithic silica aerogel slab can include cross-linked polymers. The monolithic silica aerogel slab can have a compressive strength of more than 2 MPa. The monolithic silica aerogel slab can have a bending strength of more than 1 MPa. The monolithic silica aerogel slab can have a Young's modulus of more than 5 MPa.

In accordance with another embodiment of the invention, a window pane includes the window retrofit, of any embodiment provided herein, bonded to a glass sheet.

In accordance with another embodiment of the invention, a method for producing a window retrofit includes forming a monolithic silica aerogel slab; and encapsulating the monolithic silica aerogel slab in a polymer to define the window retrofit.

Embodiments of the invention can include any one or more of the following features. The forming the monolithic silica aerogel slab includes diluting tetramethyl orthosilicate (TMOS) by methanol to create a TMOS solution; and adding an ammonia solution comprising ammonia and water to the TMOS solution to form a silica aerogel precursor, wherein a ratio of ammonia to TMOS is less than 0.0025. The method can include allowing the silica aerogel precursor to gel, thereby forming the silica aerogel. The method can include annealing the silica aerogel to reduce a pore size of pores in the silica aerogel. Encapsulating the monolithic silica aerogel can include laminating the monolithic silica aerogel slab with the polymer to define a polymer envelope. The method can include vacuum-sealing the polymer envelope. The polymer can include at least one of the group consisting of polycarbonate, polymethylpentene (PMP), poly(methyl methacrylate) (PMMA), polyethylene, polyvinyl chloride (PVC), and polytetrafluoroethylene (PTFE). The method can include prior to the encapsulating step, bonding the monolithic silica aerogel slab to a glass sheet, wherein, after encapsulation, the polymer encapsulates the monolithic silica aerogel slab and the glass sheet. The bonding the monolithic silica aerogel slab to the glass sheet can include inducing a van der Waals bond between the aerogel slab and glass sheet. The bonding the monolithic silica aerogel slab to the glass sheet can include applying an optically transparent adhesive to a surface of either the aerogel slab or the glass sheet. The method can include providing the window retrofit of any embodiment provided herein; and affixing the retrofit to a glass sheet.

BRIEF DESCRIPTION OF THE DRAWINGS

FIGS. 1A-1B are cross-sectional diagrams of an exemplary embodiment of an aerogel retrofit for a single-pane window, in accordance with an embodiment of the invention.

FIG. 2A is a perspective view of a commercially available monolithic silica aerogel slab.

FIG. 2B is a top view of a monolithic silica aerogel slab, in accordance with an embodiment of the invention.

FIG. 4A is a flow chart of a sol-gel process in accordance with an embodiment of the invention.

FIG. 4B-4E are chemical diagrams illustrating silica aerogel fabrication in accordance with embodiments of the invention.

FIG. 12A is a graph of solid conduction as a function of aerogel density. FIG. 12B is a graph of gas conduction as a function of gas pressure. FIG. 12C is a graph of radiation as a function of surface emissivity (c).

DETAILED DESCRIPTION

Figure 3B:
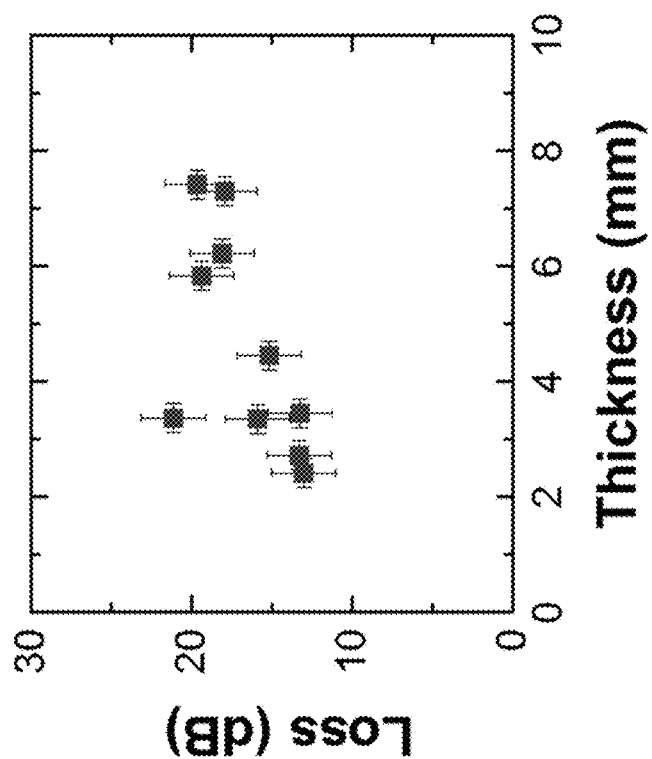
FIG. 3B is a graph of sound transmission loss (in dB) as a function of aerogel thickness (mm).

Disclosed herein are exemplary embodiments of monolithic silica aerogel retrofits for single-pane windows. Silica aerogels are a class of light-weight materials known for their thermally super-insulating properties, which can be tailored to achieve high optical transparency. However, for window applications, mechanical strength is also important. Aerogels are typically brittle and difficult to handle. In addition, to be competitive with multi-pane glazing, the thermal conductivity of state-of-the-art aerogels needs to be further reduced. Yet another desirable characteristic for window applications is the ability to reduce noise-levels. The silica aerogels described herein have improved properties, facilitating their use in window retrofits.

Exemplary Aerogel Retrofits

FIG. 1A is a cross-sectional view of a window retrofit 102 bonded to a single-pane glass sheet 103, in accordance with an embodiment of the invention. The window retrofit 102 includes a monolithic silica aerogel slab 104 encapsulated in a transparent polymer envelope 106. The aerogel slab 104 can have an average haze value of less than 5% as calculated in accordance with the American Society for Testing and Materials (ASTM) standard D1003-13 (see below section titled "ASTM D1003-13 Standard Test Method for Haze and Luminous Transmittance of Transparent Plastics").

The polymer envelope 106 can be sealed at an internal pressure of less than 1 atmosphere. A surface 110a of the retrofit 102 may be applied and/or bonded to the glass sheet 103.

In some embodiments, a low-emissivity (or "low-e") coating 108 is applied to one or more surfaces of the aerogel slab 104. In the example shown in FIG. 1A, the low-e coating 108 is applied to the surface 110b opposite the bonding surface 110a of the retrofit adjacent to the glass sheet 103. The low-e coating 108 reflects radiant infrared energy, thereby allowing visible light through while keeping the radiant infrared energy to one side of the window retrofit (i.e., on the outside, if windows are used in the outer structure of a building). Examples of low-e coatings include a pyrolytic coating ("hard coat") made using tin oxide, or sputtered coating ("soft coat") including multiple layers of silver with other protective layers. Examples of commercial low-e coatings that can be used in the retrofit include Solarban® 60 solar control low-e glass and 3M™ Thinsulate™ Climate Control Window.

The encapsulation of the aerogel 104 in a polymer envelope 106, i.e., a thin polymer layer, provides structural support to the aerogel 104 and allows for vacuum-sealing that improves its insulating properties and diminishes sound transmission. In some embodiments, the polymer includes at least one of polycarbonate, polymethylpentene (PMP, e.g., with commercial name TPX made by Mitsui Chemicals of Tokyo, Japan), poly(methyl methacrylate) (PMMA), polyethylene, polyvinyl chloride (PVC), and polytetrafluoroethylene (PTFE, e.g., with commercial name TEFLON™ made by The Chemours Company of Wilmington, Del., USA). In some embodiments, the polymer is selected for its strength (e.g., PMMA). In some embodiments, the polymer is selected for its low permeability (e.g., PVC and TPX). In some embodiments, the polymer is selected based on prior use as a sealing material (e.g., polycarbonate and polyethylene). Optionally, the polymer envelope 106 can be coated with a low-e coating, such as the low-e coatings that may be applied to the aerogel slab 104, to further reduce the radiative heat transfer as well as act as an impermeable barrier that helps maintain a moderate vacuum for a long duration.

FIG. 2A is a perspective view of an image of a commercially available aerogel 200 (available from Aerogel Technologies, Boston, Mass., USA), which is not fully transparent. On the other hand, a monolithic silica aerogel slab 202 suitable for use in the retrofit 102 is substantially transparent, as seen in FIG. 2B. In particular, the slab 202 (with an exemplary size of approximately 11 cm by 11 cm) is marked by a dotted line 204 and positioned over a print 206 (having logos of the Massachusetts Institute of Technology) to illustrate its transparency. This is a marked difference from the transparency of the commercially/available aerogel 200 of FIG. 2A. Typically, the visible transparency of silica aerogel has been limited to less than 85% due to the scattering of low wavelengths from its relatively large pores (typically greater than 50 nm), which results in its characteristic bluish or semi-obscuring hue (as illustrated by FIG. 2A). For comparison, the improved silica aerogel described herein has smaller pore sizes of 2-50 nm.

Further properties related to the porosity of a suitable silica aerogel are as follows. In some embodiments, the exemplary aerogel slab 202 has a porosity of at least 90%. In some embodiments, the exemplary aerogel slab 202 has a porosity of between 90% to 99%. In some embodiments, the exemplary aerogel slab 202 has a density selected from a range of 100 kg/m$^3$ to 200 kg/m$^3$ or 0.1 g/cm$^3$ to 0.2 g/cm$^3$. In some embodiments, the exemplary aerogel slab 202 has a pore volume selected from a range of 2000 cm$^3$/g to 4000 cm$^3$/g. In some embodiments, the exemplary aerogel slab 202 has a specific surface area selected from a range of 500 m$^2$/g to 1000 m$^2$/g.

Figure 3A:
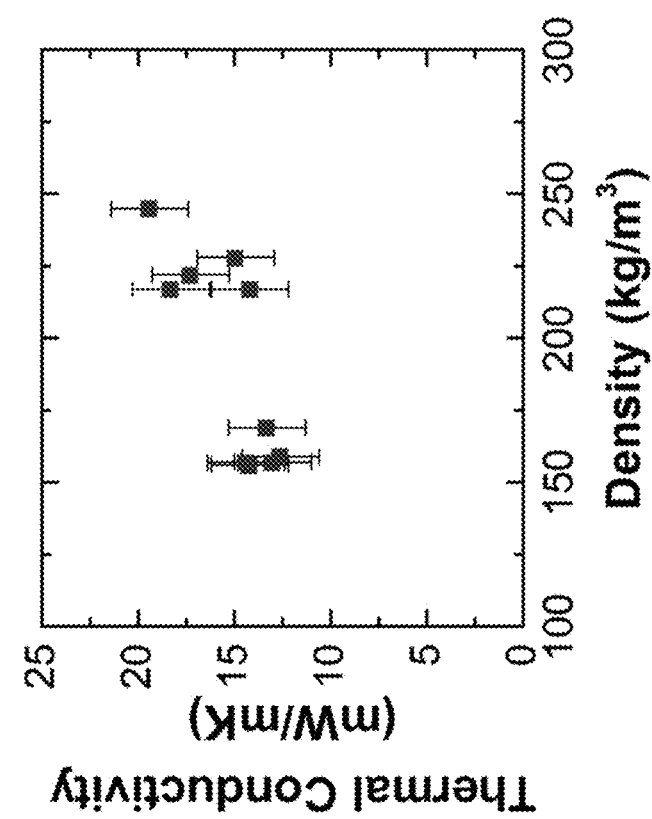
FIG. 3A is a graph of thermal conductivity (mW/mK) as a function of aerogel density ($kg/m^3$).

Aerogel slabs with the indicated small pore sizes and porosities provide other desirable characteristics, in addition to transparency. FIG. 3A illustrates the effective thermal conductivity (mW/mK) as a function of aerogel density (kg/m$^3$) as measured by a guarded hot plate at room temperature and pressure. For example, in some embodiments, the exemplary aerogel slab 202 has a thermal conductivity selected from a range of 0.005 W/m·K to 0.025 W/m·K. The aerogel is typically dominated by acoustic reflection (not absorption). FIG. 3B illustrates the sound transmission loss (in dB) as a function of aerogel thickness (mm) as measured by an impedance tube. The average speed of sound in the sound transmission class (STC) and outdoor indoor transmission class (OITC) ranges of the aerogel slab 202 is preferably less than air (less than 343 m/s). This results in sound transmission loss of 10 dB or more in silica aerogels at 2 mm or thicker. In some embodiments, the monolithic silica aerogel slab has a mechanical compressive strength of more than 2 MPa. In some embodiments, the monolithic silica aerogel slab has a bending strength of more than 1 MPa. In some embodiments, the monolithic silica aerogel slab has a Young's modulus of more than 5 MPa.

Silica Aerogel Fabrication Process

A silica aerogel slab 202 having the desired characteristics, including porosity and density, may be fabricated as follows. The synthesized silica aerogel may have properties suitable for use in an embodiment of the window retrofit 102. In general, several synthesis variables (e.g., chemical ratio, aging period, aging temperature and drying conditions) affect the spectral selectivity, thermal, and structural properties of aerogels. The absorption of radiation in an aerogel is proportional to its density. The scattering of radiation is a function of the particle size and pore size within the aerogel, which is not only a function of density, but also of the aerogel synthesis technique. By adjusting the pH of the sol-gel solution, the particle and mesoporous structure of aerogels can be tuned, thus changing the scattering coefficient. A further increase in spectral selectivity of the aerogel insulation layer may be achieved by doping aerogels with nanoparticles, such as tin oxide, indium tin oxide, carbon etc., that have strong absorption in the mid-infrared range.

The synthetic method for creating an embodiment of the silica aerogel described herein is based on Tamon et al.'s (hereafter referred to as Tamon) recipe for silica aerogel using tetramethyl orthosilicate (TMOS) as silica precursor and ammonia (NH3) as catalyst. See H. Tamon, T. Sone, and M. Okazaki, *Journal of Colloid and Interface Science* 188 (1), 162-167 (1997), the entire contents of which are incorporated by reference herein. Unlike Tamon's method where NH$_3$ is mixed with TMOS solution before adding H$_2$O, methods disclosed herein combine NH$_3$ with H$_2$O first, and then add the NH$_3$ solution to the TMOS solution.

Figure 4D:
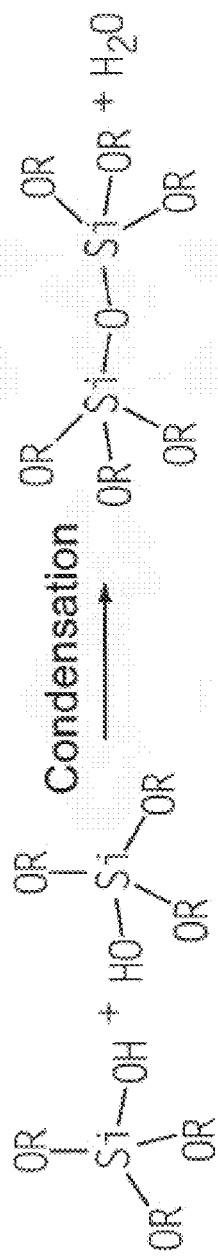
Figure 4E:
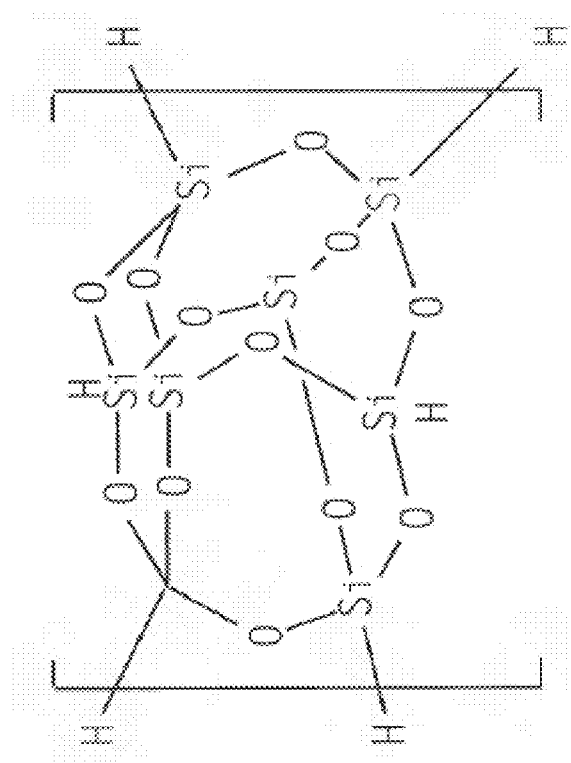

To synthesize silica aerogel, sol-gel polymerization may be used as depicted in FIG. 4A. In a process in accordance with an embodiment of the invention, TMOS is diluted in methanol to create a TMOS solution 400. The TMOS solution 400 is then mixed at room temperature with a solution of $NH_3$ and $H_2O$ 402 (step 404). In this step, TMOS 406 undergoes hydrolysis via the chemical process shown in FIG. 4B, where one of the methyl groups 408 of the TMOS 406 is replaced with a hydrogen, releasing methanol 410 in the process. After the sol is created through the mixing process 404, it is placed in a container of the desired shape and allowed to gel for e.g., two weeks 412. After two weeks, ethanol (EtOH) is added to the wet-gel in preparation for critical point drying (CPD) 414. EtOH is used as it is miscible with liquid carbon dioxide ($CO_2$). To prevent the formation of cracks, the wet-gel may be dried slowly to minimize capillary pressure during the CPD process 416. CPD may include cooling, introduction of liquid $CO_2$, pressurization, and depressurization. During depressurization at the end of CPD, a 100 psi/hr bleeding rate may be used to decrease the CPD chamber pressure from e.g., 1300 psi to ambient pressure. The final structure of the silica aerogel 418 is shown in FIG. 4E.

In some embodiments, the aerogel may be made water-repellant by treating with a hydrophobic reagent. As before, the aged gel may be removed from the mold and transferred into a glass container with pure EtOH. The hydrophobic reagent (e.g., hexamethyldisilazane (($CH_3)_3Si)_2NH$) may be added in the ethanol, at a ratio to the ethanol of, e.g., 1:9. The aged gel may be then kept in the solution at room temperature and dried in CPD as described before.

This method, in which $NH_3$ is combined with $H_2O$ first and then added to the TMOS solution, promotes the protonation of $NH_3$ in $H_2O$ resulting in sufficient hydroxide ion (—OH) in the solution. The amount of —OH significantly affects the rate of hydrolysis and condensation reactions (FIGS. 4B-4D), which dictate the particle size and pore size of silica aerogel. Additionally, Tamon reports a mixing mole ratio of [$NH_3$]:[TMOS] of 0.0737 yielding an aerogel with a pore radius of 6 nm and a transmission of 84% at a 600 nm wavelength. To obtain a mean pore radius of 5 nm or less, a molar mixing ratio of $NH_3$:TMOS:water:methanol of 0.0025:1:4:6 may be used, with the ratio of $NH_3$ to TMOS being 0.0025 or less. For example, in one embodiment, a molar mixing ratio of $NH_3$:TMOS:water:methanol equal to 0.0019:1:4:6 yields a silica aerogel with a pore radius of 2.3 nm. This embodiment demonstrates a solar weighted transmittance of 96% at 8 mm sample thickness. Accordingly, a preferred molar ratio of $NH_3$ to TMOS to achieve the desired pore size to achieve sufficiently high optical transparency is 0.0019±0.0005.

Figure 5A:
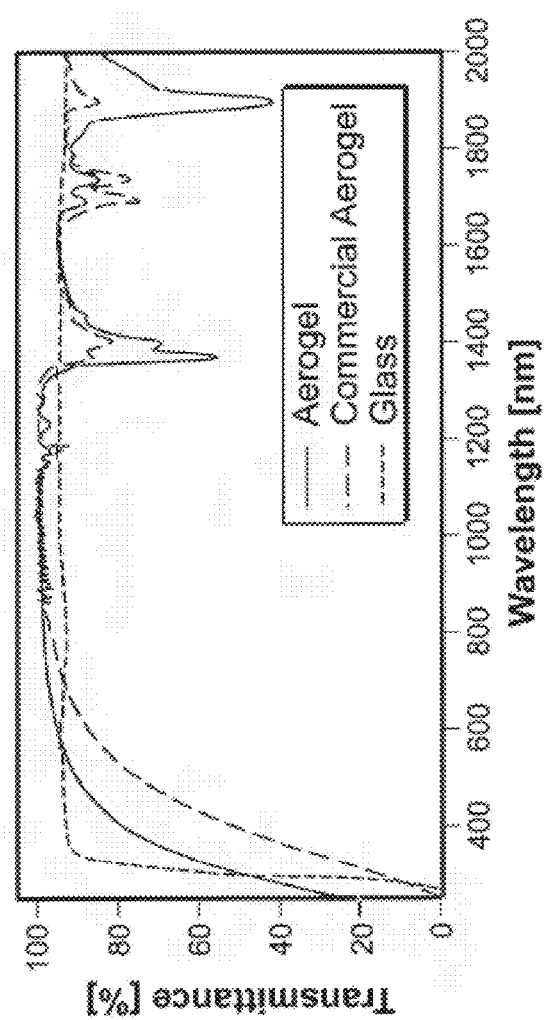
FIG. 5A is a graph comparing spectral transmittance of silica aerogel in accordance with an embodiment of the invention to glass and commercially available silica aerogel.
Figure 5B:
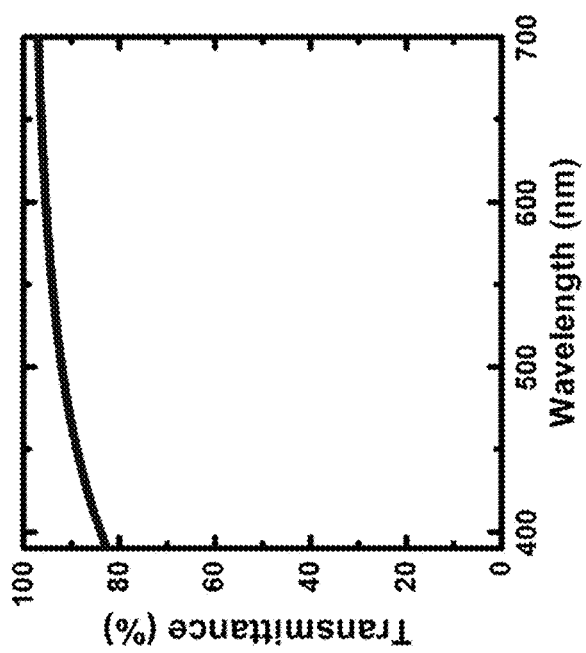
FIG. 5B is a graph of measured total transmittance (%) as a function of wavelength (nm) of the aerogel slab of FIG. 2B.

The high transmittance of suitable aerogels has been quantified experimentally. Some embodiments demonstrated 95% transmittance at a 600 nm wavelength as shown in the graph depicted in FIG. 5A. FIG. 5B is a graph of measured total transmittance (%) as a function of wavelength (nm) of the aerogel slab of FIG. 2B. The transmittance of aerogel 202 is generally greater than 80% from wavelengths 400 nm to 700 nm. In some embodiments, a monolithic aerogel slab with 8 mm thickness has a transmittance of greater than 94%. In some embodiments, a monolithic aerogel slab with a thickness of 3 mm has a transmittance of greater than 96%. The relationship between transparency and thickness of the aerogel is dependent on the specific structure of the aerogel but can be modeled based on aerogel properties as described in *Modeling silica aerogel optical performance by determining its radiative properties* (Zhao et al., 2016).

The synthesis chemistry, pH and drying dynamics may be tuned to obtain optically transparent and thermally insulating OTTI layers with properties that allow for both low thermal conductivity (<0.025 W/mK at room temperature) and high transmissivity in the 250-1100 nm wavelength range for solar radiation.

Table 1 shows the properties of an un-annealed OTTI silica aerogel in accordance with an embodiment of the invention, compared with the properties of a commercially available aerogel as measured using Small Angle X-ray Scattering (SAXS).

TABLE 1

| | Commercial aerogel sample | OTTI aerogel (un-annealed) |
|---|---|---|
| Nominal Particle Size | 1.29 ± 0.05 nm | 1.12 ± 0.06 nm |
| Nominal Pore Size | 10.25 ± 0.03 nm | 5.86 ± 0.03 nm |
| Pore Standard Deviation | — | 3.1 nm |
| Mean scattering radius | 4.16 ± 0.01 nm | 2.92 ± 0.01 nm |

These measurements indicate smaller particle size and pore size of the synthesized OTTI silica aerogel than the commercially available aerogel. The smaller particle and pore size are advantageous in giving the OTTI silica aerogel the properties that enable it to be used in the window retrofit.

Aerogel Property Enhancement Using Annealing

Figure 6A:
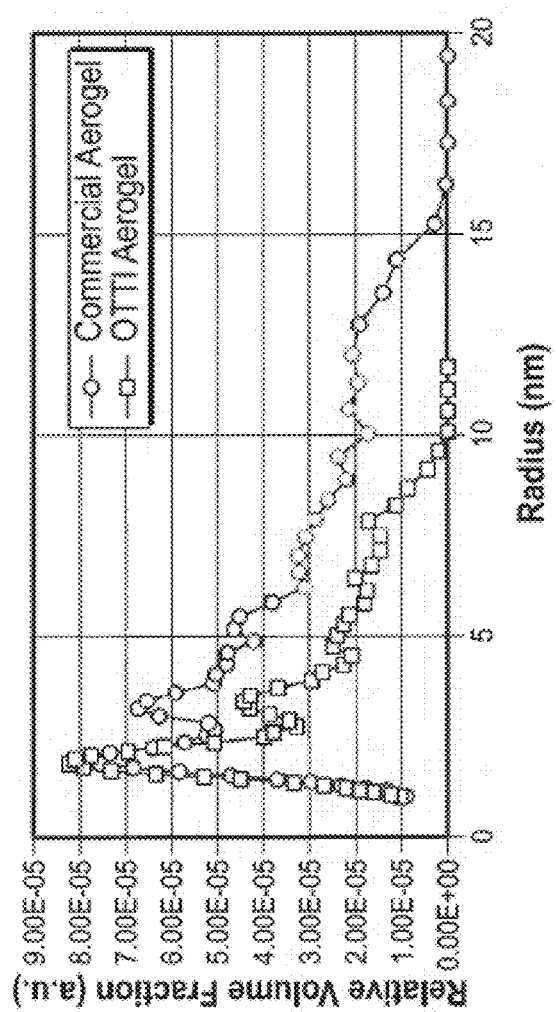
FIGS. 6A-6B are graphs comparing the pore size of a commercially available aerogel with a silica aerogel in accordance with an embodiment of the invention.
Figure 6B:
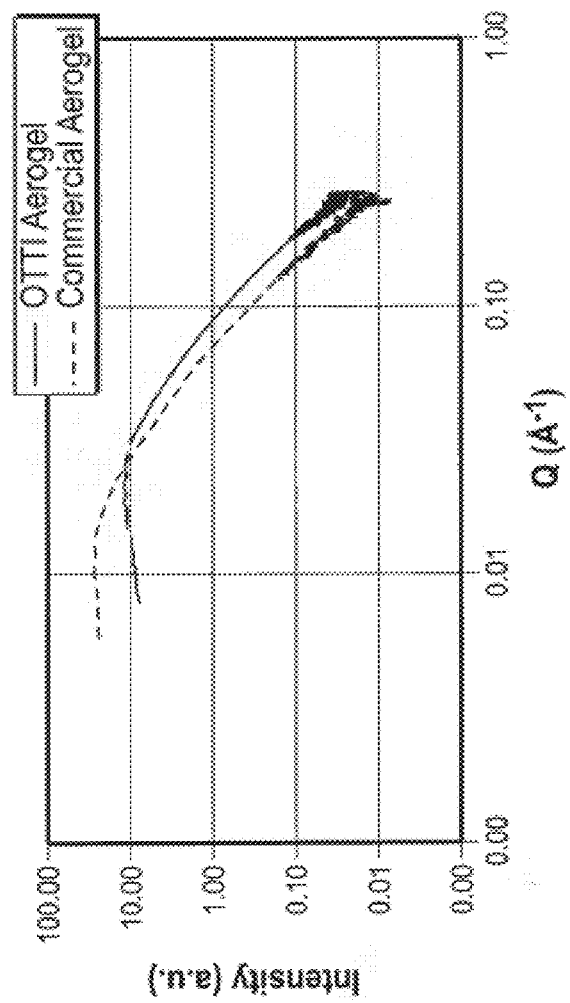

FIG. 6A is a graph of un-annealed aerogel pore size distribution (measured using SAXS). The graph shows the pore radius of the OTTI silica aerogel and of a commercially available silica aerogel monolith. The embodiment of an OTTI aerogel shown in FIG. 6A has a smaller pore radius over a narrower distribution than a commercially available aerogel. FIG. 6B shows the raw SAXS measurement data showing the scattering intensity as a function of the scattering vector. In FIG. 6B, Q is the scattering vector, where Q is inversely proportional to the size of the aerogel features. Thus, the exemplary OTTI silica aerogel demonstrates a greater number of small features (e.g., pores) than the commercially available aerogel.

Figure 7:
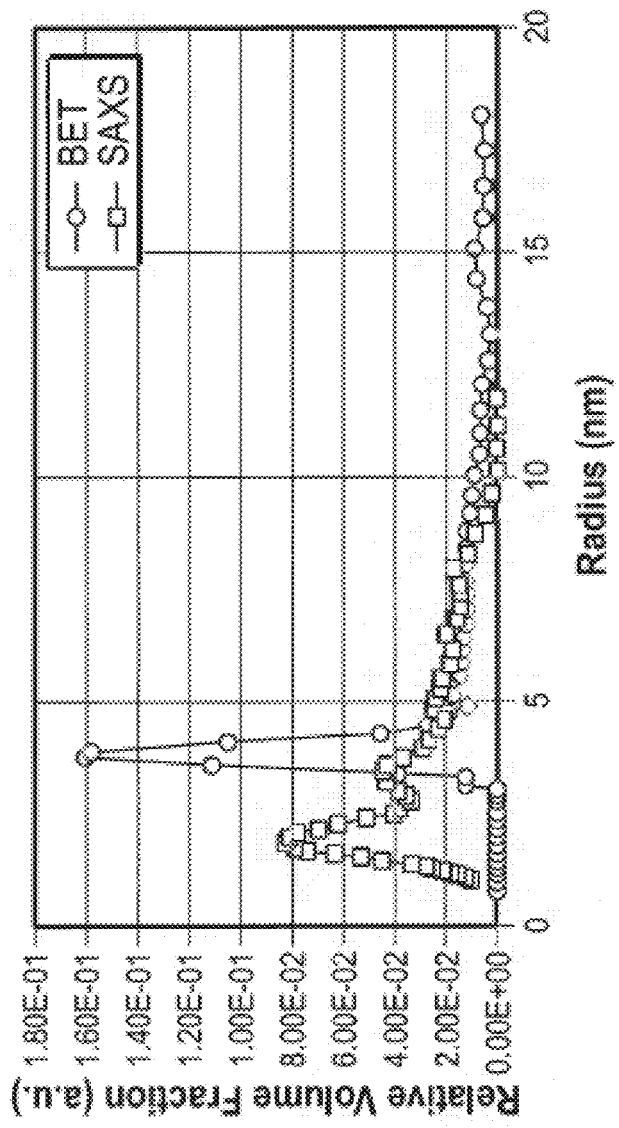
FIG. 7 is a graph of the pore radius in a silica aerogel in accordance with an embodiment of the invention.

FIG. 7 shows the OTTI silica aerogel pore size distribution as measured by SAXS and by Brunauer-Emmett-Teller analysis (BET) for an embodiment of an un-annealed OTTI aerogel. It is known by one of skill in the art that SAXS and BET yield slightly different measurements because they employ different methodologies. For example, SAXS is expected to measure average feature length of pores and particles, while BET is expected to measure pores. Nevertheless, both measurements of the pore size of the un-annealed aerogel show a peak in the distribution of a pore size of less than 5 nm.

High temperature annealing of the above described silica aerogel may eliminate hydrophilic groups (—OH) on the surface of aerogel resulting in enhancement of transmission in the absorption region (>1100 nm) by minimizing molecular absorption. Annealing may take place in an oven at a temperature of 400° C., reached by increasing the oven temperature by 10° C./min. For example, a 1200° C. dual split tube furnace, OTF-1200X, available from MTI Corporation, may be used. In some embodiments, the aerogel is annealed for 336 hours. After annealing, the aerogel sample may be cooled in a ceramic dish.

Figure 8A:
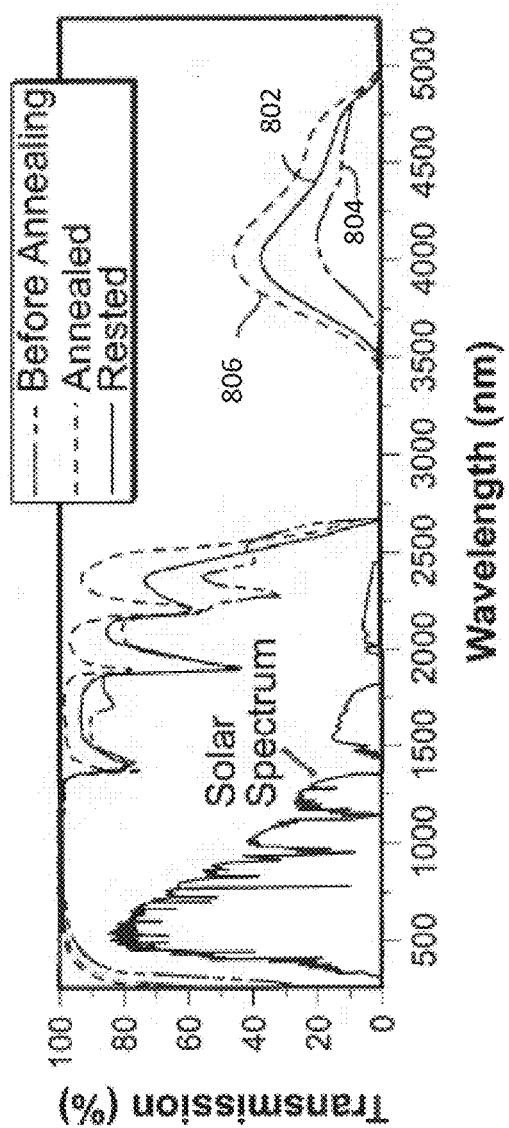
FIGS. 8A-8C are graphs of the transmittance of silica aerogels and their absorption and scattering coefficients in accordance with an embodiment of the invention.

For one embodiment, a durability test was conducted where the aerogel sample was annealed in an oven at high temperature for a long duration and allowed to rest at ambient conditions. For example, FIG. 8A shows the spectral transmission of a 4 mm thick aerogel sample annealed at 400° C. for 336 hours and rested for 552 hours 802 indicating an enhancement of transmittance in the solar spectrum (250-2500 nm) and the infrared spectrum of interest (>2500 nm). FIG. 8A compares the transmittance of this aerogel sample fabricated using the TMOS precursor before annealing at high temperature 804, after annealing 806, and after resting at ambient temperature 802. FIG. 8A inset shows an image of an optically transparent, thermally insulating monolithic silica aerogel sample. The data shows that while the maximum total transmission may be reached immediately after annealing, when the aerogel is allowed to rest at room temperature, the optical properties partially rebound towards their initial state. By allowing the samples to rest for long periods of time, a final rested state of material properties may be reached to compare to the initial and annealed states. Examining aerogel samples at these three stages allows the identification of properties that change irreversibly and reversibly with annealing, and the corresponding time scales, such as transmission, absorption, etc.

Figure 8B:
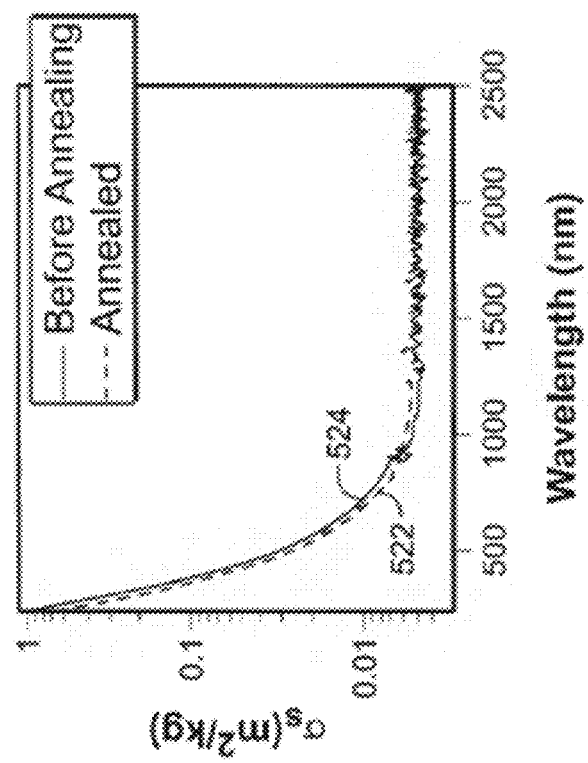

FIG. 8B shows the absorption coefficient, $\sigma_a$, corresponding to FIG. 8A which is the dominant mode of transmission loss at wavelengths >1000 nm of the silica aerogel before annealing. The data shows that the absorption coefficient may be changed over the wavelengths of interest by annealing. This change may be due to water adsorption within the inner surface of the material. Silica aerogels are naturally hydrophilic and can adsorb 5-15 wt % water in ambient conditions. Annealing the aerogel samples for a sufficiently long time and at high temperatures may drive out adsorbed water and decrease water absorption and overall density, resulting in higher transmission. The sample may readsorb water when left at ambient conditions, thereby reducing the overall transmittance. The readsorbed water may increase the mass of the rested aerogels and may cause the absorption coefficient to increase. However, irreversible change in the absorption coefficient is shown by the difference between the original transmittance and the transmittance of the annealed rested samples. This difference in transmittance may be caused by a surface chemistry change during which hydrophilic —OH bonds undergo a condensation reaction and join together to release an $H_2O$ molecule, leaving behind a Si—O—Si surface bond and making the aerogel more hydrophobic. The annealed and rested aerogels may have a decreased affinity for water absorption and may uptake less water after resting. The decrease in hydrophilicity may also increase the time needed to completely readsorb water, i.e., a sample annealed for a longer time may take longer to reach a final rested state.

Figure 8C:
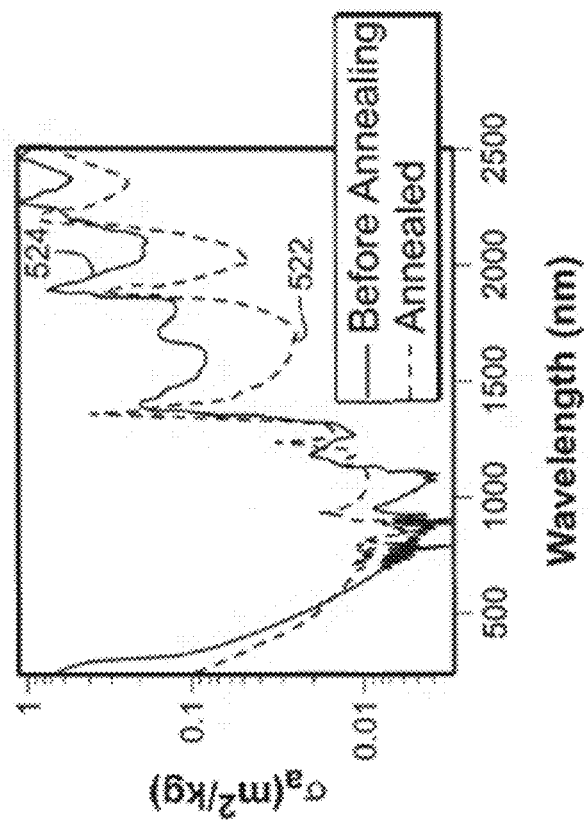

FIG. 8C shows the scattering coefficients, $\sigma_s$, for the same aerogel sample before 804 and after 806 being annealed for 336 hours at 400° C. The scattering coefficient (FIG. 8C) may have a smaller absolute change in comparison to the absorption coefficient (FIG. 8B), but since the scattering coefficient is highest at wavelengths where the solar spectrum peaks, a decrease in the scattering coefficient is advantageous in achieving high solar transmission. During annealing, the supporting network of the aerogel sample may experience structural relaxation and thermally-driven condensation. High temperature exposure may decrease the viscosity of the silica particles and allow for the material to contract and rearrange itself into a less energetic state, which may lead to a change in both particle and pore size of the network. A change in the particle and pore size may decrease the effective scattering size and increase the optical transmittance.

Figure 9B:
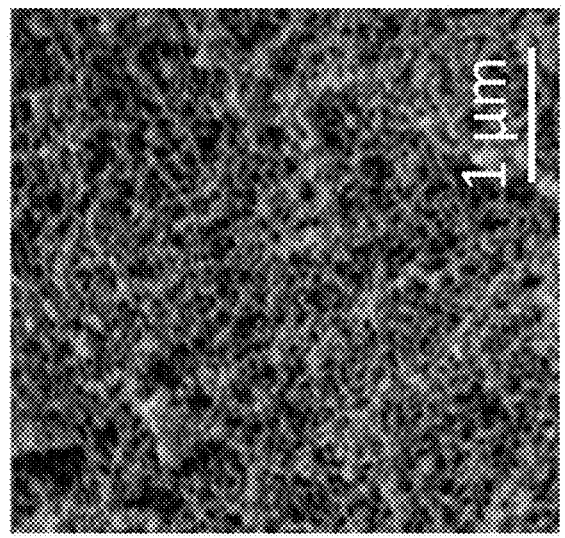
FIGS. 9A-9B are a photograph and a micrograph, respectively, of silica aerogels in accordance with embodiments of the invention.
Figure 9A:
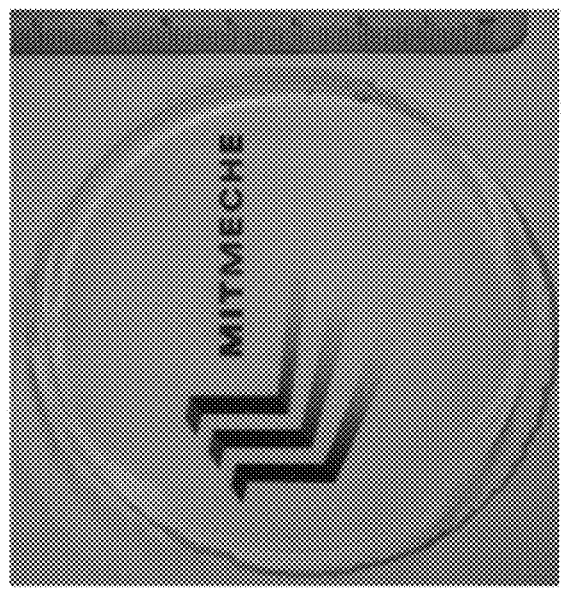

The optically transparent thermally insulating OTTI silica aerogel layers provide the desired optical transparency and thermal insulation for use in solar thermal receivers. The OTTI layer serves to reduce the radiation, conduction, and convection heat losses from the hot absorber to the ambient. FIG. 9A is a photograph of a 7 cm diameter CPD dried silica aerogel sample that has undergone annealing indicating the optical transparency of the sample. FIG. 9B is a scanning electron microscope (SEM) image of fabricated silica aerogel that has not been annealed with large surface area and high porosity. Some embodiments of the OTTI silica aerogel demonstrate 96% solar weighted transmittance through 8 mm thickness and a heat transfer coefficient <7 W/m2K between 400° C. and 100° C. In some embodiments, these properties may be retained even after subjecting aerogel samples to high temperatures (e.g., 400° C.) and high humidity (e.g., >80% RH) conditions for >100 hours.

Table 2 summarizes monolithic silica aerogel SAXS characterization before and after annealing at 600° C. for 4 hours.

TABLE 2

|  | Before Annealing | After Annealing |
|---|---|---|
| Solar-weighted transmittance (4 mm thick sample) | 95.6 ± 0.3% | 98.0 ± 0.3% |
| Particle size | 1.29 ± 0.05 nm | 1.30 ± 0.06 nm |
| Pore size | 4.70 ± 0.02 nm | 4.28 ± 0.02 nm |
| Mean scattering length | 2.91 ± 0.03 nm | 2.79 ± 0.02 nm |

The data in Table 2 demonstrates the increase in solar-weighted transmittance and decrease in pore size that may be achieved through annealing of the silica aerogel.

In some embodiments, the mean pore radius of the silica aerogel is less than 5 nm with a standard deviation of 3 nm. In some embodiments the silica aerogel has a mean particle size of 1.3 nm and includes solids of less than 10%. In some embodiments, an 8 mm thick silica aerogel in thermal contact with a blackbody absorber has a solar absorptance of greater than 0.9 and an IR emittance of less than 0.3 at high temperatures, such as ~400° C. Further discussion about the preparation and properties of suitable silica aerogels can be found in PCT Publication No. WO2017/147463, published on Aug. 31, 2017, and titled "Solar Thermal Aerogel Receiver and Materials Therefor," which is incorporated herein by reference.

Figure 10:
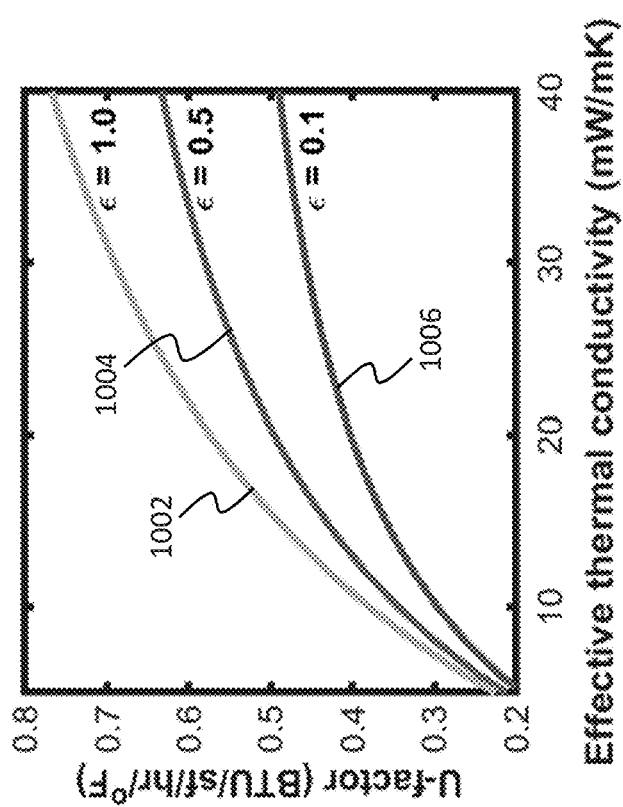
FIG. 10 is a graph of estimated U-factors (BTU/sf/hr/° F.) of windows with different emissivity ratings as a function of thermal conductivity (mW/m·K).

FIG. 10 is a graph of the relationship between U-factors (BTU/sf/hr/° F.) and different emissivity ratings ($\varepsilon$=1.0 (line 1002); $\varepsilon$=0.5 (line 1004); $\varepsilon$=0.1 (line 1006)) as a function of thermal conductivity (mW/m·K). Note the lower U-factor for the lower emissivity ratings. The retrofit 102 can minimize heat loss due to conduction, convection, and/or radiation leading to estimated winter U-factors of <0.5 BTU/sf/hr/° F., matching the performance of costly air-filled double-paned windows. In some embodiments, the aerogel slab itself is rated with a U-factor of <0.5 BTU/sf/hr/° F. In some embodiments, the aerogel retrofit 102 can maintain this U-factor at external temperatures of −15° C. or greater. In some embodiments, the aerogel retrofit 102 can maintain this U-factor at external temperatures of 20° C. or less, 30° C. or less, 40° C. or less, 50° C. or less, or 60° C. or less. The graph of FIG. 10 also illustrates the effect of various low-e coatings (which can change the emissivity) in the window retrofit on U-factor as a function of thermal conductivity.

While the solid conduction within the aerogel is inherently linked to its structure and density, the gas conduction is linked to the presence of gas in the nanopores that can dominate the heat transfer at room temperature and pressure.

Gas conduction can, however, be significantly diminished by partially evacuating the gas from aerogel pores.

Figure 11B:
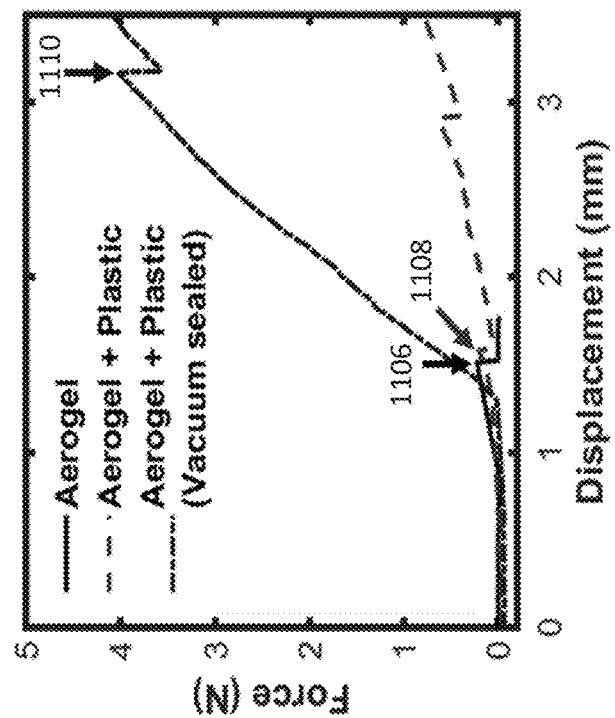
FIG. 11B is a graph illustrating flexural strength of aerogels, including the exemplary sealed aerogel of FIG. 11A, measured in units of force (N) as a function of displacement (mm).
Figure 11A:
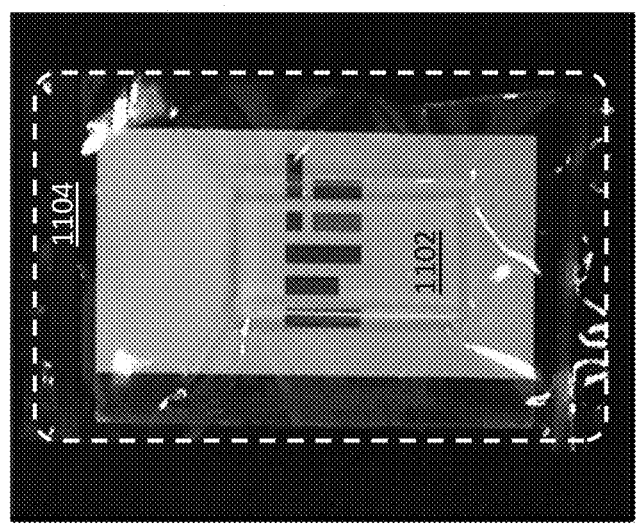
FIG. 11A is an photograph of an exemplary aerogel vacuum-sealed in plastic, in accordance with an embodiment of the invention.

The mechanical strength of a window retrofit in accordance with an embodiment of the invention has been measured. FIG. 11A is a photograph of an aerogel 1102 vacuum-sealed in plastic 504. The aerogel 1102 is overlaid on a logo (of "MIT") to illustrate its transparency. The aerogel sample (30 mm×15 mm×3 mm) is vacuum-sealed in a polyethylene envelope for the bending test, shown in FIG. 11B. FIG. 11B is a graph illustrating flexural strength of aerogels, including the exemplary sealed aerogel of FIG. 11A, measured in force (N) as function of displacement (mm). While aerogels have high compressive strength (>10 MPa), their flexural strength is quite low (<0.2 MPa). The aerogel (shown in a solid line), with little bending force, breaks at approximately 1.5 mm of displacement (arrow 1106). The aerogel contained in plastic without vacuum-sealing (shown in a dashed line) is marginally better than the aerogel alone, with a failure at approximately 1.6 mm (arrow 1108). Finally, the aerogel vacuum-sealed in plastic (shown in the variable dashed line) is significantly improved over the other two measurements, with a failure at approximately 3.2 mm at an applied force of approximately 4 N.

Figure 12A:
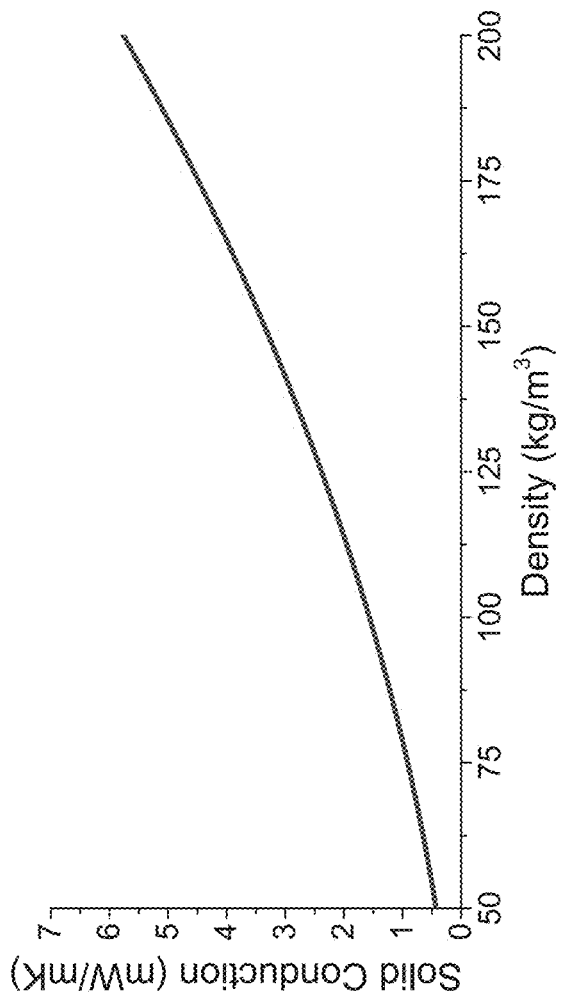
FIGS. 12A-12C illustrate heat transfer through an exemplary aerogel retrofit.
Figure 12B:
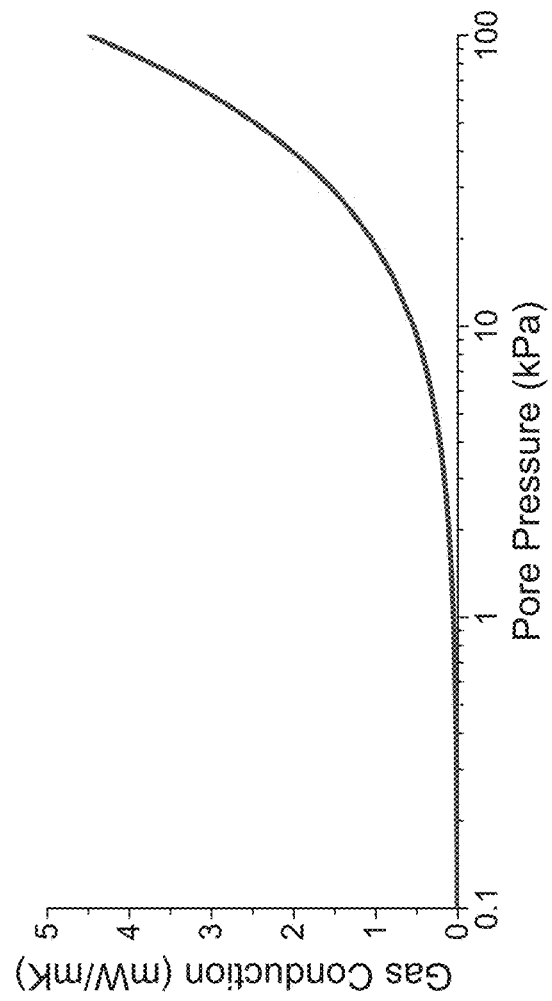
Figure 12C:
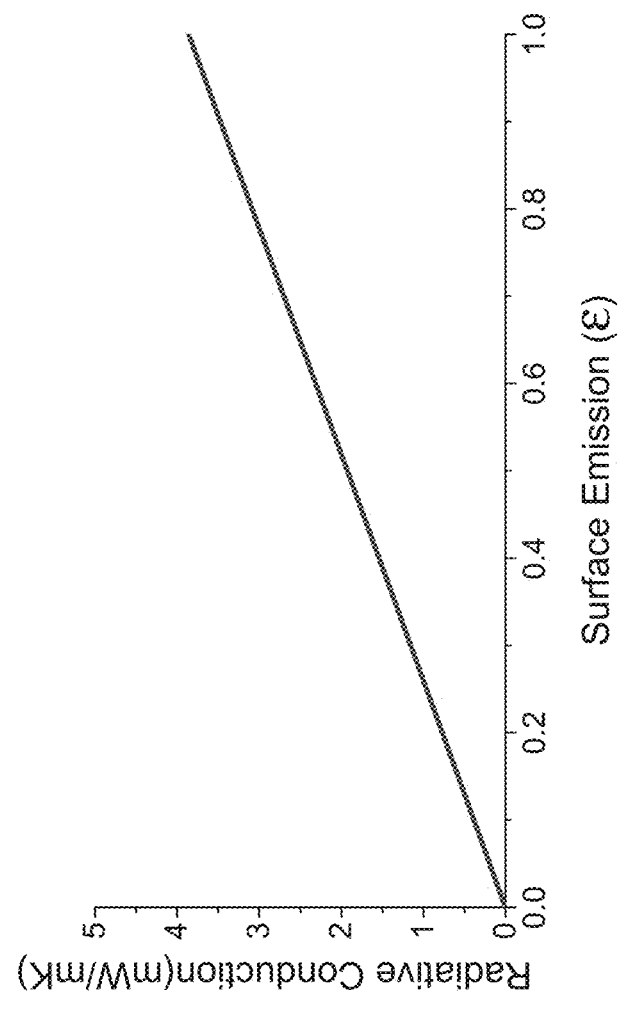
Figures 13A, 13B:
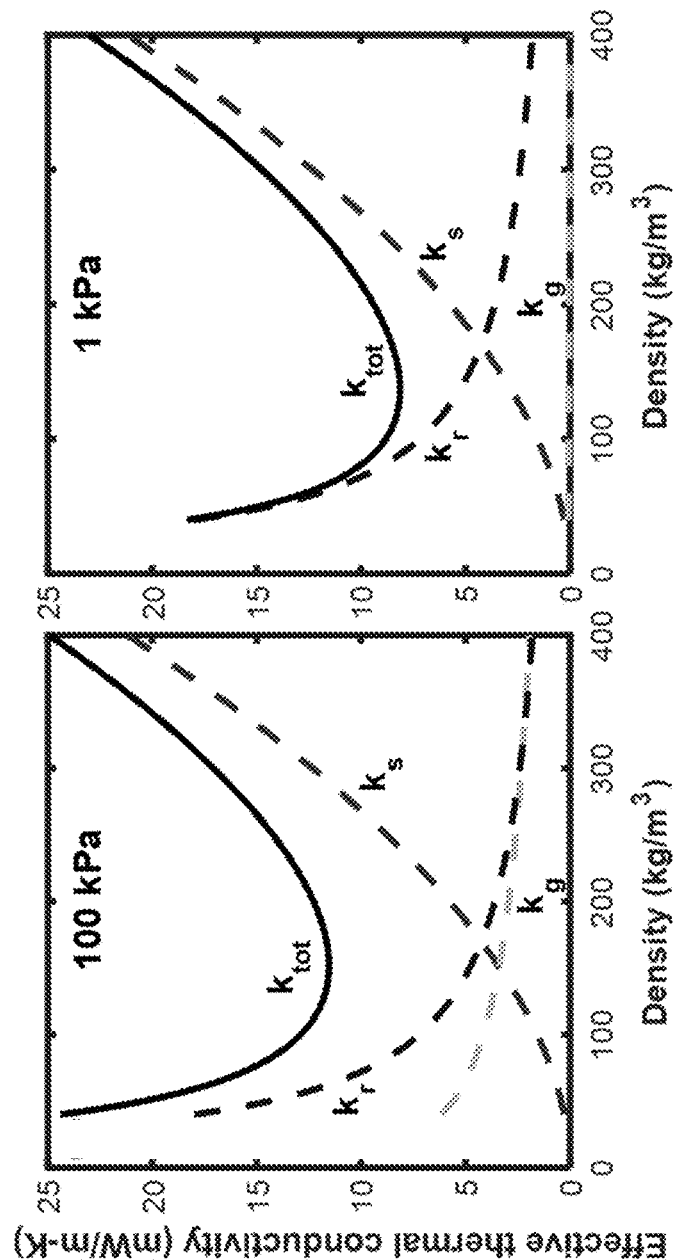
FIGS. 13A-13B are graphs of modeled effective thermal conductivity (mW/m·K) of an aerogel, in accordance with an embodiment of the invention, as a function of density ($kg/m^3$) at atmospheric pressure (100 kPa), compared to when the aerogel is partially evacuated at 1 kPa.

FIGS. 12A-12C are graphs illustrating heat transfer through an exemplary aerogel retrofit. FIG. 12A is a graph of solid conduction as a function of aerogel density (kg/m$^3$) for an exemplary aerogel operating in "winter conditions" at a thickness of 3 mm at pore pressure of 101 kPa (i.e., solid conduction increases with aerogel density). In some embodiments, "winter conditions" is defined as a set of conditions in which the internal temperature (i.e., interior side of the window retrofit) is at approximately 21° C., and an external temperature (i.e., exterior side of the window retrofit) of approximately −18° C. In some embodiments, "winter conditions" is defined with a temperature of −15° C. or greater. Solid conduction can be minimized by providing a low-density nanoporous aerogel structure. While the solid conduction within the aerogel is inherently linked to its structure and density, the gas conduction is linked to the presence of gas in the nanopores, which can dominate heat transfer at room temperature and pressure. FIG. 12B is a graph of gas conduction as a function of pore pressure (kPa) for an exemplary aerogel having a thickness of 3 mm with density of 125 kg/m$^3$. Gas conduction can be diminished by reducing gas pressure by, e.g., partially evacuating the gas from the aerogel pores and/or by maintaining a partial vacuum within the polymer-encapsulation (as illustrated by FIGS. 13A-13B). FIG. 12C is a graph of radiative thermal conductivity as a function of surface emissivity (c) for an exemplary aerogel having a thickness of 3 mm at ambient pressure and density of 125 kg/m$^3$ (i.e., radiation increases with surface emissivity). Radiative transfer can be decreased using a low-e coating on the polymer layer.

The impact of maintaining a partial vacuum within the polymer envelope has been modeled. In particular, FIGS. 13A-13B are graphs of modeled effective thermal conductivity (mW/m·K) of an exemplary aerogel ($k_{tot}$) as a function of density (kg/m$^3$) at atmospheric pressure (100 kPa) as compared to when the aerogel is partially evacuated at 1 kPa. The solid ($k_s$) and gas ($k_g$) conduction contributions are critical at room temperature, while the radiative ($k_r$) contribution becomes important at higher temperatures. The gas conduction contribution is negligible when the aerogel is partially evacuated (FIG. 13B) compared to when it is at atmospheric pressure (FIG. 13A). Thus, the vacuum-sealed, polymer-encapsulated aerogel (at 1 kPa) has a lowered thermal conductivity as compared to aerogel at atmospheric pressure. This lowered conductivity is especially advantageous in window applications for its insulating effect, especially in cold climates.

Exemplary Methods for Forming Aerogel Retrofits

Figure 14:
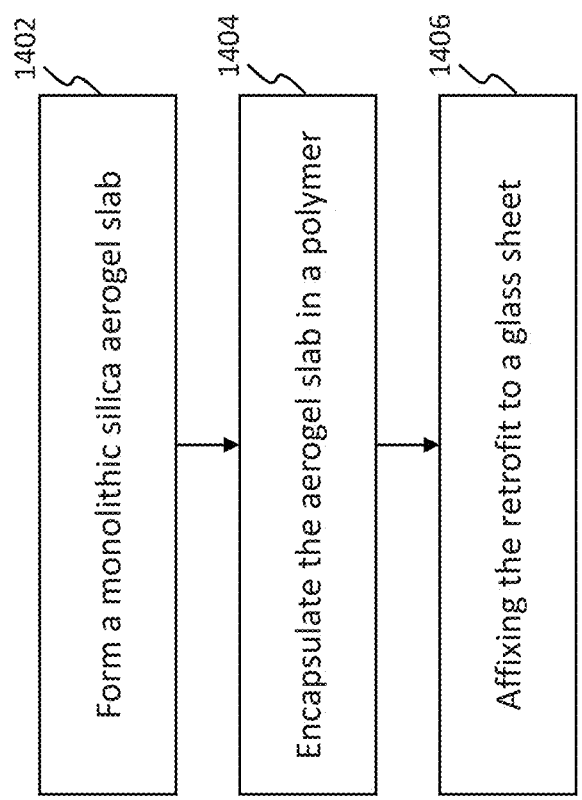
FIG. 14 is a flowchart of a method for producing and installing a window retrofit, in accordance with an embodiment of the invention.

FIG. 14 is a high-level flowchart of an exemplary method for producing and installing the window retrofit 102, in accordance with an embodiment of the invention. First, in step 1402, the monolithic silica aerogel slab 104 is formed, as further detailed below with reference to FIG. 16. Next, in step 1404, the aerogel slab 104 is encapsulated in a polymer envelope 106. This forms the retrofit 102 which, in step 1406, is affixed to a glass sheet 103 (such as by bonding) This method can be useful in pre-forming retrofits 102 to be installed onto fixed window panes in buildings.

Figures 15A, 15B:
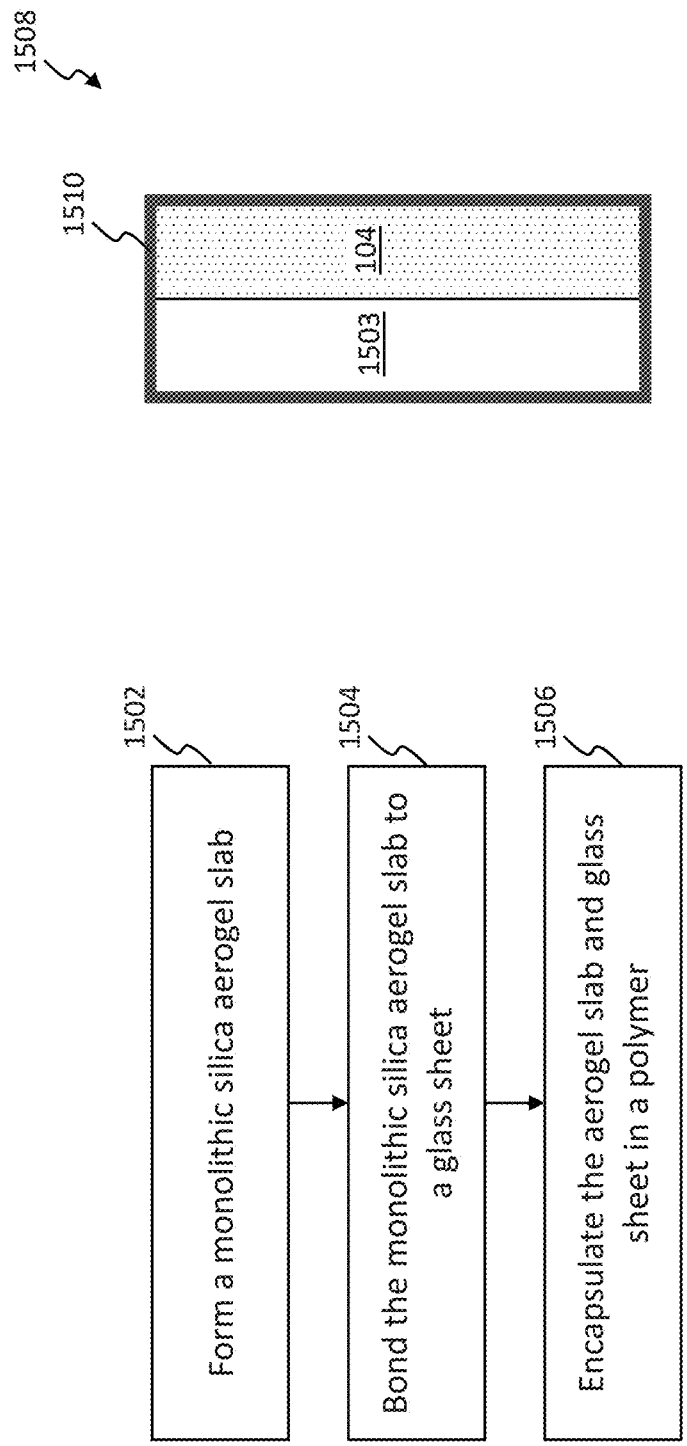
FIG. 15A is a flowchart of a method for producing an aerogel-glass sheet assembly, illustrated in FIG. 15B, in accordance with an embodiment of the invention.
FIG. 15B illustrates an aerogel-glass sheet assembly, in accordance with an embodiment of the invention.

FIG. 15A is a high-level flowchart of an exemplary method for producing an aerogel-glass sheet assembly 1508, as illustrated in FIG. 15B. In step 1502, the monolithic silica aerogel slab 104 is formed, as detailed above and below in FIG. 16. Next, the aerogel 104 is directly bonded to the glass sheet 1503. In some embodiments, the thickness of glass sheet 1503 is less than the thickness of glass sheet 103. In some embodiments, the thickness of glass sheet 1503 is typically less than the thickness of glass sheets used for windows, e.g., less than ⅛ inches (3 mm), less than 3/16 inches (5 mm), less than ¼ inches (6 mm), etc. The aerogel-glass sheet assembly is then encapsulated in a polymer envelope 1510. In some embodiments, the aerogel 104 is bonded to the glass sheet 103, such by van der Waals bonds and/or by applying optically transparent adhesives. The adhesive can be applied to the surface of the aerogel slab 104 and/or glass sheet 103 and pressed together.

Figure 16:
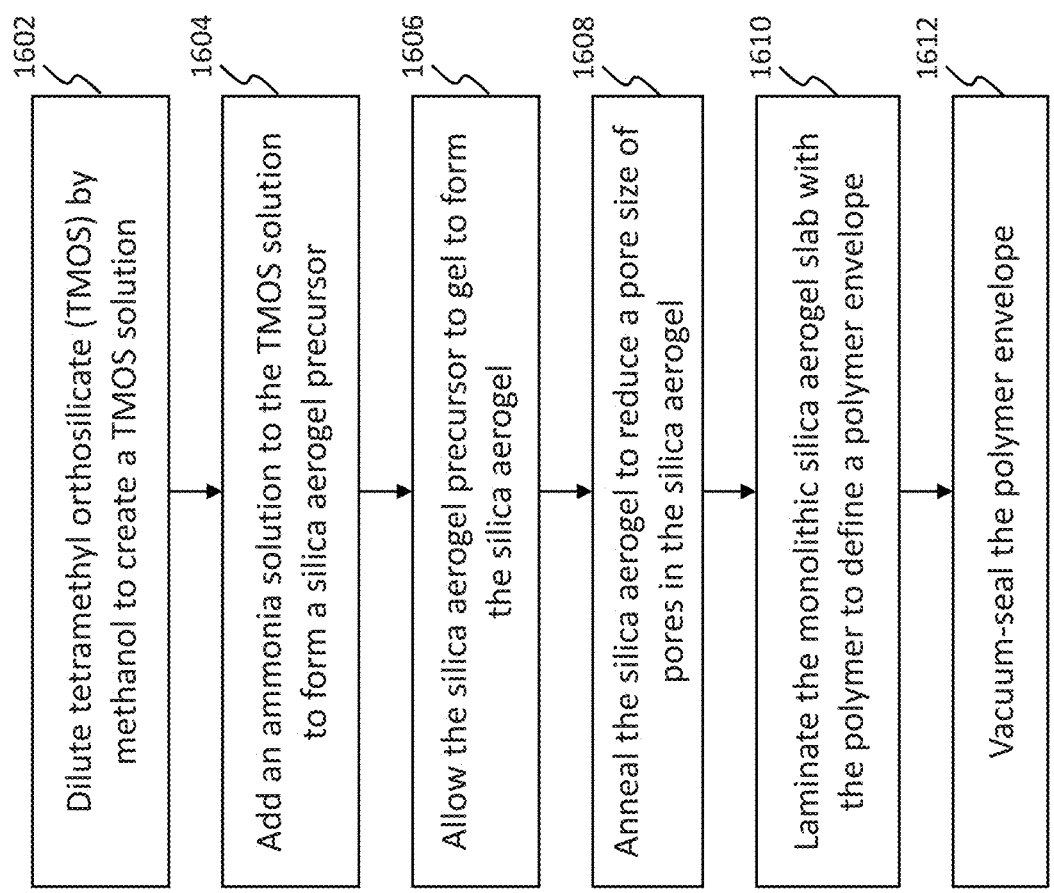
FIG. 16 is a flowchart of a method for producing a window retrofit, in accordance with an embodiment of the invention.
Figure 17:
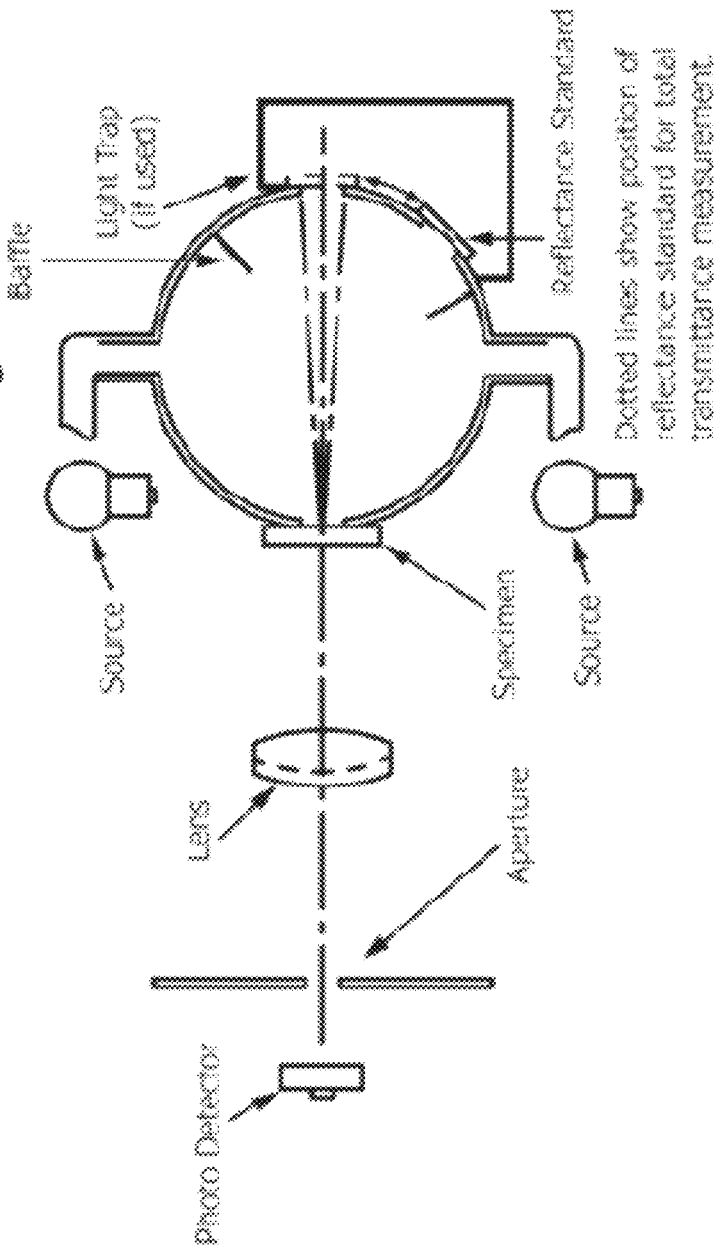
FIG. 17 is a diagram of a cross-sectional view of a spectrophotometer with diffuse illumination.

FIG. 16 is a flowchart of an exemplary method of producing a window retrofit 102. In step 1602, tetramethyl orthosilicate (TMOS) is diluted with methanol to create a TMOS solution. Next, in step 1604, an ammonia solution (including ammonia and water) is added to the TMOS solution to form a silica aerogel precursor. The ratio of ammonia to TMOS is less than 0.0025. In step 1606, the aerogel precursor is allowed to gel to form the silica aerogel. Next, in step 1608, the silica aerogel is annealed to reduce a pore size of pores in the silica aerogel. This aerogel synthesis process can be tailored (e.g., by controlling the sol-gel ratios, by aging time and temperature, by adding a controlled ambient drying step, etc.) to alter the nanostructure of the aerogel, in addition to optimizing its density and thickness for window applications. In some embodiments, the intrinsic mechanical strength of silica aerogels can be increased such as by cross-linking with polymers (via polymer infusion).

To ensure quality of the aerogel samples, any one or more of the following techniques can be utilized. The aerogel nanostructure can be characterized using techniques such as scanning electron microscopy (SEM), transmission electron microscopy (TEM), Brunauer-Emmet-Teller (BET) surface area analysis, and small-angle X-ray scattering (SAXS). Optionally, the optical properties of the monolithic samples, including its visible transmission (using a ultraviolet-visible (UV-Vis) spectrophotometer) and infrared (IR) absorption (using an Fourier-transform infrared (FTIR) spectrometer) can be measured. The thermal characterization can be performed using a custom-built steady-state setup specifically designed for silica aerogels that can measure its effective thermal conductivity at different temperatures and pressure.

In step 1610, the silica aerogel is laminated with a polymer to form a polymer envelope. The polymer envelope 106 can be partially evacuated before encapsulating the slab 104 and being sealed. To ensure quality of the polymer envelope, the procured polymer sheets and their optical properties can be characterized in the visible and IR wavelengths. In step 1612, the polymer envelope containing the aerogel is vacuum-sealed. In some implementations, a vacuum laminator can be used to seal the aerogel monolith inside the polymer encapsulation at a sub-atmospheric pressure, which pre-stresses the aerogel and increases its rigidity. For example, by enclosing an aerogel sample within a plastic envelope and sealing using an off-the-shelf vacuum food-sealer (examples of sealers include the 65-0501-W Vacuum Sealer by Weston Brands LLC of Southern Pines, N.C., USA or the FoodSaver FM2000-FFP Vacuum Sealing System by Sunbeam Products, Inc. of Boca Raton, Fla., USA) can increase the flexural strength of the aerogel by more than an order of magnitude (refer to FIGS. 11A-11B). Typically, it is beneficial for the polymer envelope to have a low permeability for air and moisture. The permeability is dependent on the type of polymer used as well as its thickness. In some embodiments, a polymer with a nitrogen permeability coefficient less than 2.2 $cm^3*cm/(cm^2*s*cm*Hg)$ can be used for the polymer envelope. In clear window applications (non-obscured windows), the polymer is ideally highly transparent and low-haze in the visible spectrum (more than 80% transmission, less than 3% haze). The process of sealing the aerogel with the polymer is dependent on the polymer and pressure selected, but options can include processes already used in industry, such as those used for food sealing and laminated glass. For example, as in the food-sealing industry, the aerogel slab 104 can be positioned inside a polymer envelope made of one or more sheets of polymer material (with each side of the envelope sealed). Then, with the use of a vacuum, air from inside the envelope is removed so that the inside of the envelope comes into close contact with the aerogel surface. Typically, the vacuum is placed at an opening of the polymer envelope. During, or directly after this process, the aerogel 104 is sealed within the polymer envelope by sealing the opening in the envelope for the vacuum.

Exemplary methods of applying a vacuum to the polymer envelope containing the aerogel monolith include nozzle vacuuming, chamber vacuumizing, thermoforming, vacuum skin packaging, applying pressure, hot fill, etc. (Perdue, Richard. "Vacuum Packaging." The Wiley Encyclopedia of Packaging Technology, Third Ed., John Wiley & Sons, 2009, pages 1259-1270), as described further herein. In some embodiments, nozzle vacuuming can be used to apply a vacuum. Specifically, a nozzle connected to a vacuum pump is applied to the open end of the envelope to remove air from inside the envelope. In some embodiments, chamber vacuumizing can be used to apply a vacuum. For example, the polymer envelope containing the aerogel can be placed inside a chamber configured to produce a vacuum (e.g., to ≥29 in. Hg) on both the inside and outside of the envelope.

In some embodiments, thermoforming can be used to apply a vacuum to the polymer envelope containing the aerogel. Specifically, one layer of the polymer envelope can be fed to a thermoforming machine to create a pocket for the aerogel monolith. The bottom layer (also called a "bottom web") of the envelope is heated and the aerogel is loaded into the formed pocket. The top layer (also called the "top web") is then disposed over the bottom layer between two halves of a vacuum-sealing chamber. The chamber creates a vacuum on both sides of the bottom and top layers (e.g., at ≥29 in. Hg). When the desired vacuum level is reached, the layers are heat-sealed together. In some embodiments, vacuum skin packaging can be used to apply a vacuum to the polymer envelope containing the aerogel. Vacuum skin packaging is highly similar to the thermoforming process except that the top layer is held over (e.g., by a high vacuum applied to one side of the top layer) the aerogel monolith in a vacuum chamber until a desired vacuum level is reached. Once reached, the top layer is released and near-instantaneously forms to the shape of the aerogel and heat-seals to the bottom layer upon contact.

In some embodiments, pressure can be applied (e.g., via water or sponges) to the outside of the polymer envelope until most of the air is forced out of the bag. The open end of the polymer envelope can be sealed and the pressure can be released. In some embodiments, the polymer envelope is filled with steam (typically above 180□) which causes air to leave the interior of the envelope. The envelope is sealed and then rapidly chilled, which causes negative pressure inside the sealed envelope.

In one or more of the vacuum application methods described herein, the envelope may be sealed by bringing together the sides of the open end of the envelope and applying heat to the envelope.

In another example, vacuum lamination used in the electronics industry may be implemented for vacuuming the aerogel into the polymer envelope. One type of vacuum lamination is "diaphragm lamination" in which the aerogel can be placed within an unsealed polymer envelope. During diaphragm lamination, air is injected into a balloon outside the polymer envelope, effectively displacing the air inside the polymer envelope. The polymer envelope can then be sealed. This type of lamination has the advantage of minimal force on the aerogel itself as the pressure used is low. A window retrofit may be part of a building (such as a house, apartment, office, etc.) or vehicle and have the advantage of being optically transparent while providing thermal insulation and reducing noise. The retrofit 102 can be installed either with a free-standing glass sheet 103 or applied directly to an existing window glass pane. In some embodiments, the retrofit-glass combination may be installed into an existing window frame. For example, referring to FIG. 1B, a window retrofit in accordance with embodiments of the invention may be part of a window installation 112, with the glass 103 and aerogel 104 being positioned within a frame 114.

In some embodiments, one or more portions of the polymer envelope is coated with low-e coatings. To ensure quality, the optimal coating thickness of the low-e coating may be calculated and verified using reflectance measurements in the visible and IR wavelengths. The deposition of the coatings can be by chemical vapor deposition (CVD) and/or sputter-deposition.

ASTM D1003-13 Standard Test Method for Haze and Luminous Transmittance of Transparent Plastics The ASTM standard D1003-13 (ASTM International. "Standard Test Method for Haze and Luminous Transmittance of Transparent Plastics." D1003-13, West Conshohocken, Pa.: ASTM International, November 2013) provides two procedures, Procedure A and Procedure B, for determining the haze value of transparent plastics. Procedure A (section 5 of standard D1003-13) employs a hazemeter for the determination of haze value. Procedure B (section 8 of standard D1003-13) utilizes a spectrophotometer to determine the haze value of materials, as provided verbatim herein below:

8. Procedure B (Spectrophotometer)
8.1 Apparatus:
8.1.1 The instruments used for measurement shall meet the geometric and spectral requirement of this section. [Table 3 omitted]

TABLE 4

Summary of 1991 Procedure B (Spectrophotometer) Total Haze Round Robin Involving Seven Laboratories

| Material | Average | $S(r)^A$ | $S(R)^B$ | $r^C$ | $R^D$ |
|---|---|---|---|---|---|
| LDPE | | | | | |
| A | 0.55 | 0.076 | 0.186 | 0.213 | 0.522 |
| B | 1.77 | 0.087 | 0.658 | 0.244 | 1.019 |
| C | 1.01 | 0.042 | 0.397 | 0.175 | 1.112 |
| PET | | | | | |
| D | 2.51 | 0.115 | 0.331 | 0.323 | 0.927 |
| E | 5.05 | 0.081 | 0.596 | 0.227 | 1.669 |
| F | 6.55 | 0.189 | 1.138 | 0.305 | 3.186 |
| G | 11.35 | 0.137 | 1.289 | 0.385 | 3.610 |
| H | 25.45 | 0.158 | 3.020 | 0.443 | 8.455 |

$^A S_r$ is the within laboratory standard deviation for the indicated material. It is obtained by pooling the within-laboratory standard deviations of the test results from all of the participating laboratories: $S_r = [[(s_1)^2 + (s_2)^2 + \ldots + (s_n)^2]/n]^{1/2}$
$^B S_R$ is the between laboratories reproducibility, expressed as standard deviation: $S_R = [s_r^2 + s_L^2]^{1/2}$ where: $s_L$ = standard deviation of laboratory means.
$^C r$ is the within-laboratory critical interval between two test results = 2.8 × $S_r$.
$^D R$ is the between-laboratories critical interval between two test results = 2.8 × $S_R$.

8.1.2 The instrument shall be capable of computing from the spectral data the 1931 CIE tristimulus values and related color coordinates for CIE standard Illuminant C or alternatively Illuminant A.

8.1.3 The instrument shall utilize a hemispherical optical measuring system, with an integrating sphere, in which the specimen can be placed flush against the sphere port. The surfaces of the interior of the integrating sphere, baffles, and reflectance standards shall be matte, of substantially equal reflectance and highly reflecting throughout the visible wavelengths.

8.1.4 Two geometries can be used: unidirectional illumination with diffuse viewing and diffuse illumination with unidirectional viewing. Using diffuse illumination with unidirectional viewing, the following apply:

8.1.4.1 Use an integrating sphere to illuminate the specimen diffusely; the sphere may be of any diameter as long as the total port areas do not exceed 4.0% of the internal reflecting area of the sphere. The specimen and light trap ports of the sphere shall be centered on the same great circle of the sphere, and there shall be at least 2.97 rad (170°) of arc between their centers. The light trap port shall subtend an angle of 0.14 rad (8°) at the center of the specimen port along the viewing beam. With the light trap in position, without specimen the axis of the viewing beam shall pass through the centers of the specimen and light trap ports.

8.1.4.2 View the specimen along an axis defined by a substantially unidirectional beam; the maximum angle that any ray of this beam may make with the beam axis shall not exceed 0.05 rad (3°). This beam shall not be vignetted at either port of the sphere.

8.1.4.3 When the specimen is in place, the angle between the specimen normal and the line connecting the centers of the specimen and the light trap ports shall not exceed 0.14 rad (8°).

8.1.4.4 With no specimen in place, the viewed area at the exit port shall be approximately circular, sharply defined concentric within the light trap port, leaving an annulus of 0.023±0.002 rad (1.3±0.01°) subtended at the specimen port.

NOTE 7—Note 4 and Note 5 apply. It should be noted that it may be difficult, but is critical, to meet this requirement.

[NOTE 4—It is important to verify whether the unobstructed-beam diameter and centering at the exit port are maintained, especially if the source aperture and focus are changed.

NOTE 5—The tolerance stated on the annulus of 0.002 rad (0.1°) corresponds to an uncertainty of ±0.6% in a haze reading.[7] [Footnote 7: Weidner, V. R., and Hsia, J. J., "NBS Reference Hazemeter: Its Development and Testing," Applied Optics, Vol 18, 1979, pp. 1619-1626.] This is relevant for assessing the precision and bias of this test method.]

8.1.5 A light trap shall be provided that will completely absorb the beam when no specimen is present, or the instrument design shall obviate the need for a light trap.

8.1.6 A schematic drawing of a spectrophotometer with unidirectional illumination and diffuse viewing is shown in FIG. [17].

8.2 Procedure—Follow the manufacturer's instructions for the measurement of haze, and if none available, use Section 8.

8.3 Calculation—Most spectrophotometers are computer driven and values for luminous transmission and haze are automatically calculated. If values are not computed use calculation method in Section 9.

8.4 Report:
8.4.1 Report the following data:
8.4.1.1 Source and identity of specimen,
8.4.1.2 Nominal thickness of specimen to the nearest 0.0025 mm or better for specimens less than 0.25 mm in thickness and to the nearest 0.025 mm or better for specimens greater than 0.25 mm in thickness.
8.4.1.3 Percent haze, to the nearest 0.1% (indicate the average when reporting average values),
8.4.1.4 Total luminous transmittance, $T_t$, to the nearest 0.1% (indicate the average when reporting average values and specify whether CIE Illuminant C or A is used) when specifically requested, and
8.4.1.5 Diffuse luminous transmittance, $T_d$, to the nearest 0.1% (indicate the average when reporting average values) when specifically requested.

8.5 Precision and Bias[11] [Footnote 11: Supporting data have been filed at ASTM International Headquarters and may be obtained by requesting Research Report RR:D20-11801:
8.5.1 Precision:
8.5.1.1 Precision data in Table 4 is based on a round robin conducted in 1991 involving eight materials and seven laboratories. For comparison purposes the same materials were measured on six regular hazemeters during the same round robin . . . . (Warning—The following explanations of r and R (8.5.1.2-8.5.1.6) are intended to present only a meaningful way of considering the approximate precision of this test method. The data in Table . . . 4 should not be applied rigorously to acceptance or rejection of material, as those data are specific to the round robin and may not be representative of other lots, conditions, materials, or laboratories. Users of this test method should apply the principles outlined in Practice E691 to generate data specific to their laboratory and materials, or between specific laboratories. The principles of 8.5.1.2-8.5.1.6 would then be valid for such data.)

8.5.1.2 For the purpose of compiling summary statistics, a test result has been defined to be the average of three replicate measurements of a property for a material in a laboratory, as specified in this test method. Summary statistics are given in Table 4. In each table, for the material indicated, S(r) is the pooled within-laboratory standard deviation of a test result, S(R) is the between-laboratory standard deviation of a test result, r=2.83× S(r) (see 8.5.1.3), and R=2.83×S(R) (see 8.5.1.4).

8.5.1.3 Repeatability—In comparing two mean values of the same material, obtained by the same operator using the same equipment on the same day, the means should be judged not equivalent if they differ by more than the r value for that material.

8.5.1.4 Reproducibility—In comparing two mean values for the same material obtained by different operators using different equipment on different days, either in the same laboratory or in different laboratories, the means should be judged not equivalent if they differ by more than the R value for that material.

8.5.1.5 Judgments made as described in 8.5.1.3 and 8.5.1.4 will be correct in approximately 95% of such comparisons.

8.5.1.6 For further information, see Practice E691.

8.5.2 Bias—Measurement biases cannot be determined since there are no accepted referee methods for determining these properties.

(ASTM International standard D1003-13, published November 2013, pages 4-5.)

XI. Derivation of Formulas for Haze

X1.1 The derivation of the formula for haze for both procedures is as follows:

X1.1.1 Total luminous transmittance, $T_t$, is calculated as follows:

$$T_t = T_2/T_1 \tag{X1.1}$$

where:

$T_2$=total light transmitted by the specimen, and
$T_1$=incident light.

X1.1.2 If $T_3$, the light scattered by the instrument, is zero, the diffuse luminous transmittance, $T_d$, is calculated as follows:

$$T_d = T_4/T_1 \tag{X1.2}$$

where:

$T_4$=light scattered by the instrument and specimen.

X1.1.3 If $T_3$ is greater than zero due to light scattered by the instrument, the total scattered light, $T_4$, will be greater than the light scattered by the specimen by an amount proportional to $T_3$ and equal to $T_3$ times $T_2/T_1$. The corrected amount of light scattered by the specimen will then be the following:

$$T_4 - T_3(T_2/T_1) \tag{X1.3}$$

X1.1.4 The diffuse luminous transmittance, $T_d$, is then calculated as follows:

$$T_d = [T_4 - T_3(T_2/T_1)]/T_1 \tag{X1.4}$$

X1.1.5 Percent haze is then calculated from the ratio of diffuse, $T_d$, to total luminous transmittance, $T_t$, as follows:

$$\begin{aligned} \text{haze, \%} &= (T_d/T_t) \times 100 \tag{X1.5} \\ &= [(T_4 - T_3(T_2/T_1))/T_1 \div (T_2/T_1)] \times 100 \\ &= [(T_4 - T_3(T_2/T_1))/T_2] \times 100 \\ &= [(T_4/T_2) - (T_3/T_1)] \times 100 \end{aligned}$$

(ASTM International standard D1003-13, published November 2013, page 6.)

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A window retrofit comprising:
   a monolithic silica aerogel slab having (i) an average haze value of <5% as calculated in accordance with ASTM standard D1003-13 and (ii) a U-factor of <0.5 BTU/sf/hr/° F.; and
   a transparent polymer envelope sealed at an internal pressure of ≤1 atmosphere, wherein the monolithic silica aerogel slab is encapsulated in the transparent polymer envelope.

2. The window retrofit of claim 1, wherein the monolithic aerogel slab has a transmittance >94% at 8 mm thickness.

3. The window retrofit of claim 2, wherein the monolithic aerogel slab has a transmittance >96% at 3 mm thickness.

4. The window retrofit of claim 1, further comprising a low-emissivity coating disposed on a surface of the transparent polymer envelope.

5. The window retrofit of claim 1, further comprising an anti-reflective coating disposed on a surface of the transparent polymer envelope.

6. The window retrofit of claim 1, further comprising:
   a glass sheet, the monolithic silica aerogel slab being bonded to the glass sheet,
   wherein the transparent polymer envelope encapsulates the monolithic silica aerogel slab bonded to the glass sheet.

7. The window retrofit of claim 1, wherein the slab has the U-factor of <0.5 BTU/sf/hr/° F. at an external temperature of −15° C. or greater.

8. The window retrofit of claim 1, wherein the monolithic silica aerogel slab has a porosity of at least 90%.

9. The window retrofit of claim 1, wherein the monolithic silica aerogel slab has a density selected from a range of 0.1 g/cm$^3$ to 0.2 g/cm$^3$.

10. The window retrofit of claim 1, wherein the monolithic silica aerogel slab has a pore volume selected from a range of 2000 cm$^3$/g to 4000 cm$^3$/g.

11. The window retrofit of claim 1, wherein the monolithic silica aerogel slab has a specific surface area selected from a range of 500 m$^2$/g to 1000 m$^2$/g.

12. The window retrofit of claim 1, wherein the monolithic silica aerogel slab has a thermal conductivity selected from a range of 0.005 W/m·K to 0.025 W/m·K.

13. The window retrofit of claim 1, wherein the monolithic silica aerogel slab comprises cross-linked polymers.

14. The window retrofit of claim 1, wherein the monolithic silica aerogel slab has an average sound transmission loss of 10 dB or greater at one or more frequencies selected from a range of 50 Hz to 1600 Hz.

15. The window retrofit of claim 1, wherein the monolithic silica aerogel slab has a compressive strength of more than 2 MPa.

16. The window retrofit of claim 1, wherein the monolithic silica aerogel slab has a bending strength of more than 1 MPa.

17. The window retrofit of claim 1, wherein the monolithic silica aerogel slab has a Young's modulus of more than 5 MPa.

18. A method for producing a window retrofit, the method comprising:
   forming a monolithic silica aerogel slab; and
   encapsulating the monolithic silica aerogel slab in a polymer to define the window retrofit.

19. The method of claim 18, wherein encapsulating the monolithic silica aerogel comprises:
   laminating the monolithic silica aerogel slab with the polymer to define a polymer envelope.

20. The method of claim 18, further comprising:
   prior to the encapsulating step, bonding the monolithic silica aerogel slab to a glass sheet,
   wherein, after encapsulation, the polymer encapsulates the monolithic silica aerogel slab and the glass sheet.

* * * * *